United States Patent [19]
Seo

[11] Patent Number: 5,912,652
[45] Date of Patent: Jun. 15, 1999

[54] MAGNETIC FLUID DISPLAY PANEL AND METHOD OF MAKING THE PANEL

[75] Inventor: Jong-wook Seo, Seoul, Rep. of Korea

[73] Assignee: Jong-Seng Won, Seoul, Rep. of Korea

[21] Appl. No.: 08/891,063

[22] Filed: Jul. 10, 1997

[30] Foreign Application Priority Data

Jul. 10, 1996 [KR] Rep. of Korea ........................ 96-27772
Apr. 24, 1997 [KR] Rep. of Korea ........................ 97-15344

[51] Int. Cl.[6] ........................................................ G09G 3/28
[52] U.S. Cl. .................................. 345/60; 345/107; 445/24
[58] Field of Search ................ 345/60, 107; 340/815.44, 340/815.55; 359/228; 445/24

[56] References Cited

U.S. PATENT DOCUMENTS

| | | | |
|---|---|---|---|
| 3,648,269 | 3/1972 | Rosenweig et al. | 340/815.5 |
| 3,670,323 | 6/1972 | Sobel et al. | 345/107 |
| 3,863,249 | 1/1975 | Olah | 340/815.44 |
| 3,972,595 | 8/1976 | Romankiw et al. | 359/228 |

FOREIGN PATENT DOCUMENTS 0633488  1/1995  European Pat. Off. .

*Primary Examiner*—Richard A. Hjerpe
*Assistant Examiner*—Francis Nguyen
*Attorney, Agent, or Firm*—Leydig, Voit & Mayer, Ltd.

[57] ABSTRACT

A magnetic fluid display panel includes a front plate and a rear plate, separated from each other, first electrodes arranged in linear strips on the inner surface of the rear plate in a first direction, second electrodes arranged in strips in a direction perpendicular to the first electrodes and electrically insulated from the first electrodes, pixel electrodes in a pattern at intersecting points of the first electrodes and the second electrodes, having light transmission areas through which light can pass, and electrically connected to adjacent first and second electrodes for forming a magnetic field around the pixel electrodes, and a magnetic fluid on the inner surface of the rear plate in the vicinity of the pixel electrodes. The display panel can be easily manufactured, thus reducing manufacturing costs. In particular, a moving color picture can be easily produced by the display panel.

44 Claims, 25 Drawing Sheets

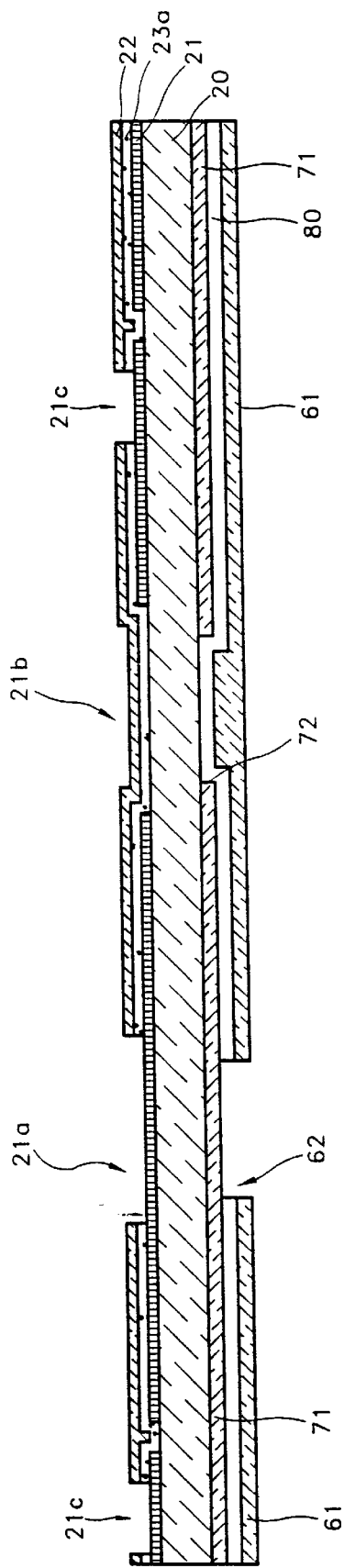
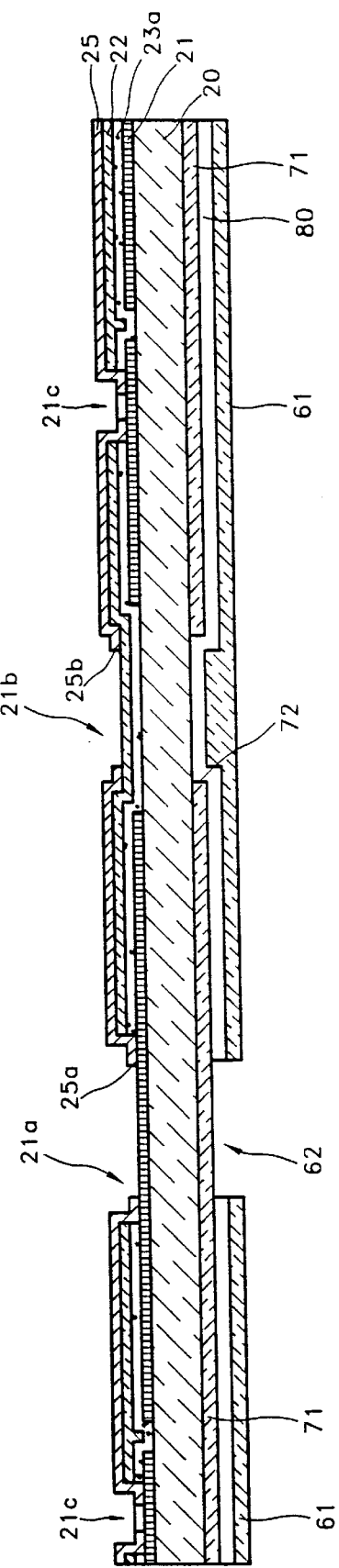

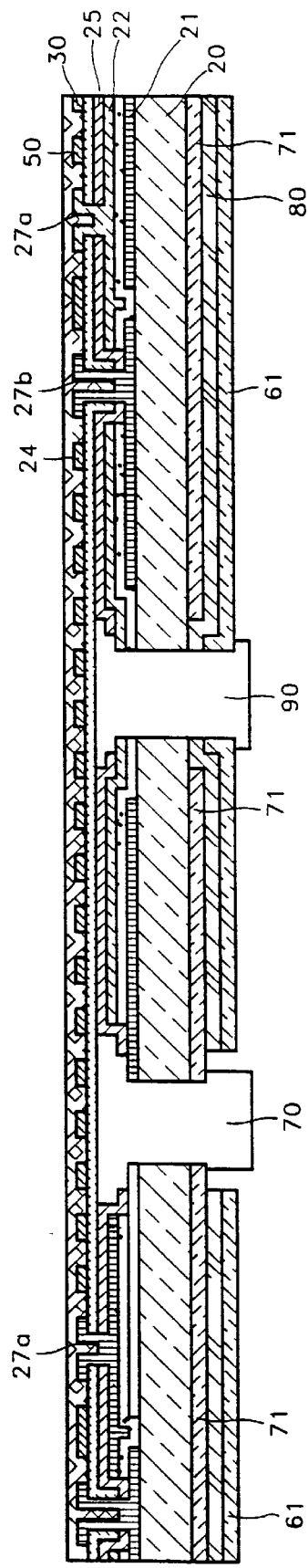
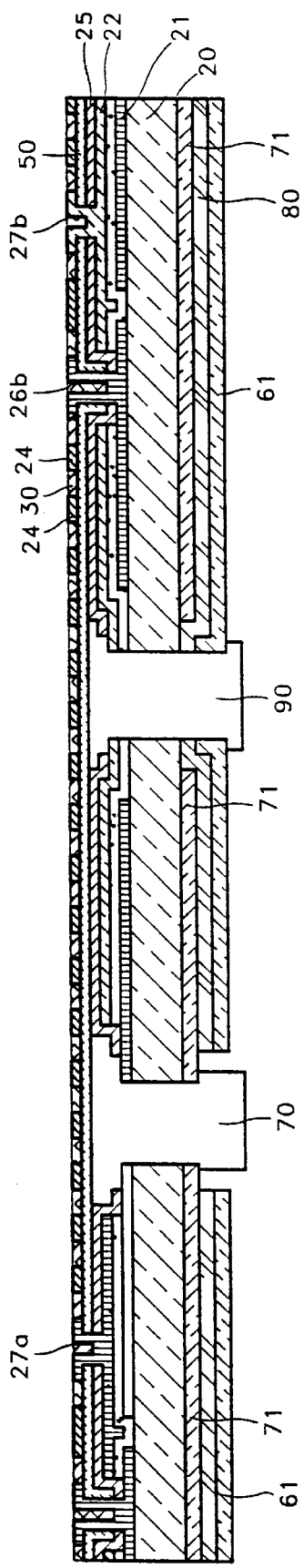

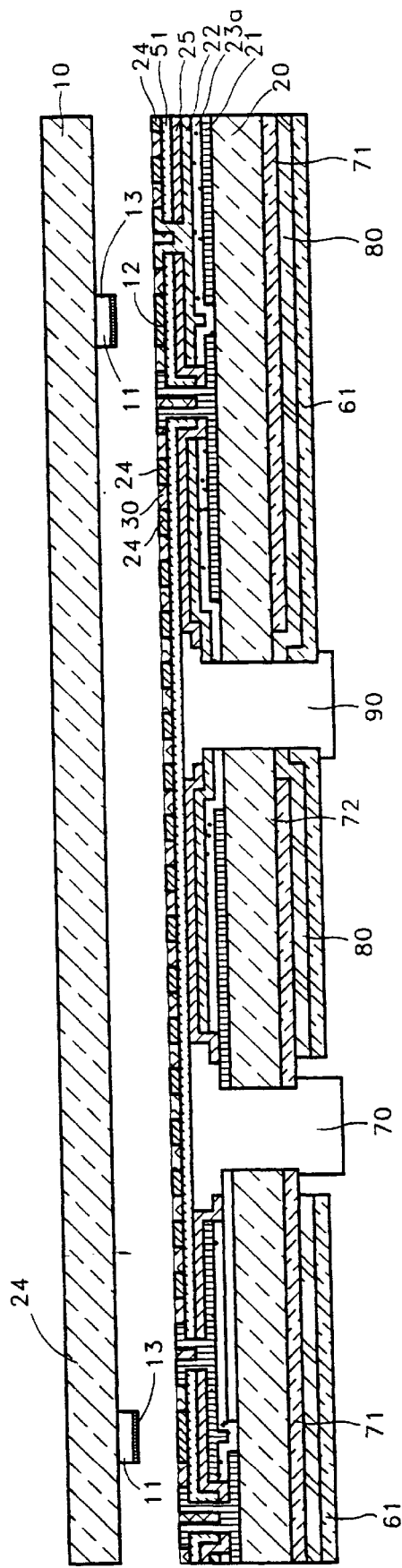

MAGNETIC FLUID DISPLAY PANEL AND METHOD OF MAKING THE PANEL

BACKGROUND OF THE INVENTION

The present invention relates to a magnetic fluid display panel, and more particularly, to a magnetic fluid display panel which is highly responsive and easy to manufacture.

After the invention of cathode ray tube (CRT) as a display device using an accelerated electron beam, the plasma display panel (PDP) using plasma discharge, and the liquid crystal display (LCD) using liquid crystals having electrooptic effects were developed. Also, there are vacuum fluorescent displays (VFD) using an electron beam which is accelerated at a low speed, electro luminescent displays (ELD) using electro-luminous elements, and a magnetic fluid display panel using magnetic fluid. Such display devices are categorized into an active display type, which emits light, and a non-active display type, which does not emit light and requires an additional light source.

The LCD used for notebook computers is representative of the non-active display type. The LCD is applied to small electronic goods as well as notebook computers since it is light, thin, and small and consumes little power. However, the LCD has a shortcoming in that the manufacturing process is complicated due to the difficulties related with liquid crystal handling. For example, the liquid crystal material is injected by a complicated vacuum injection method since air should not reside in the liquid crystal layer between a front plate and a rear plate which are separated from each other by a predetermined distance. The inner space of the LCD must be shielded by partition walls of a predetermined width for the liquid crystal to be injected in a vacuum state by a method such as vacuum injection method. Therefore, a dummy space occupies a considerable portion of the effective screen area due to the partition walls when a display device for a large screen is manufactured by combining multiple LCD panels, thus the continuity of picture between the LCD panels deteriorates. Additionally, heat-resistant materials should be used for the fabrication of an LCD since the LCD undergoes high temperature processes and it is difficult to manufacture a large-screen LCD since it undergoes complicated processes.

The magnetic fluid display panel is also one of the non-active display devices. As well known, the magnetic fluid is a magnetic colloid in which hyperfine ferromagnetic particles are stably diffused. The ferromagnetic particles in the magnetic fluid do not separate from the fluid under an ordinary centrifugal force or an ordinary magnetic field, and the fluid acts as if it is paramagnetic material in a magnetic field. A metal oxide magnetic fluid and a metal magnetic fluid are examples of the magnetic fluid. An example to which the magnetic fluid is applied for display applications is provided in European Patent Publication 0633488 A1, in which a principle similar to a conventional LCD is applied.

Referring to FIG. 1, a magnetic fluid 4 is interposed between a front plate 1 and a rear plate 2. A plurality of magnetic field coils 3 of a pixel unit, for applying magnetic fields to the magnetic fluid 4 in which magnetic particles with geometric anisotropy are diffused, are installed at the rear portion of the rear plate 2. The magnetic field coils 3 are connected to a display controller 5 to drive the sample. According to the description of this prior art, the magnetic field coils 3 have a structure in which loop-like patterns formed of multiple layers on a multi-stack substrate are connected by a through hole. In such a display panel, light is transmitted by applying a magnetic field to a portion (ON) in which the transmission of light 6 is required and aligning the magnetic particles in that portion, and light is absorbed and blocked in a portion (OFF) in which the magnetic particles are not aligned but are randomly scattered as shown in FIG. 2.

It is very difficult to give geometric anisotropy to the magnetic particles of the magnetic fluid in a hyperfine state and light control by the aligned/non-aligned magnetic particles is not easily performed. In addition, the processes for manufacturing the magnetic field coils 3 are very complicated since the magnetic field coils 3 for providing the magnetic field to the magnetic fluid have a multi-stack structure.

In U.S. Pat. No. 3,863,249, which describes another magnetic fluid display panel, light is blocked or transmitted in the light transmission area by positioning the magnetic fluid in the light transmission area or moving the magnetic fluid to another location by a magnetic force without alignment/non-alignment of the magnetic particles. However, the magnetic fluid display panel requires high electrical power since a strong magnetic field is required for the movement of the magnetic fluid and is not suitable for moving pictures since a pixel switching response by the magnetic fluid is very slow. Additionally, the manufacturing costs of the magnetic fluid display panel are high and the magnetic fluid display panel is not suitable for mass production and miniaturization since it has a structure in which magnetic coils formed separately must be attached as magnetic field forming means.

SUMMARY OF THE INVENTION

It is an object of the present invention to provide a display panel having a rapid response, thus capable of displaying motion pictures.

It is another object of the present invention to provide a magnetic fluid display panel with low manufacturing cost and, simple structure, thus facilitating manufacture and mass production.

It is still another object of the present invention to provide a magnetic fluid display panel which is advantageous for the construction of an extra-large display device.

To achieve the above objects, there is provided a magnetic fluid display panel, comprising a front plate and a rear plate, separated from each other by a predetermined distance, a plurality of first electrodes arranged in strips and linearly on the inner surface of the rear plate in a first direction, a plurality of second electrodes arranged in strips in a direction perpendicular to the first electrodes and electrically insulated from the first electrodes, pixel electrodes of a predetermined pattern formed at intersecting points of the first electrodes and the second electrodes, having light transmission areas through which light can pass, and electrically connected to adjacent first and second electrodes for forming a magnetic field around the electrodes, and magnetic fluid existing on the inner surface of the rear plate in the vicinity of the pixel electrodes.

To achieve the above objects, there is provided a magnetic fluid display panel, comprising a front plate and a rear plate, separated from each other by a predetermined distance, a plurality of first electrodes arranged in strips and linearly on the inner surface of the rear plate in a first direction, a plurality of second electrodes formed in strips on the rear plate in a direction perpendicular to the first electrodes and electrically insulated from the first electrodes, a plurality of third electrodes formed to have a predetermined pattern for forming magnetic field and comprising a first sub-pixel electrode having mass regions separated from each other by a predetermined distance and a second sub-pixel electrodes of a predetermined pattern having mass regions separated from each other by a predetermined distance, wherein the first sub-pixel electrode is electrically connected to the first and second electrodes and the second sub-pixel electrode is electrically connected to the second and third electrodes, and magnetic fluid formed on the rear plate to a predetermined thickness in the vicinity of the pixel electrodes.

To achieve the above objects, there is provided a method for manufacturing a display panel, comprising the steps of forming a plurality of electrodes in strips and linearly on the inner surface of the rear plate in a first direction, forming a first insulating film on the first electrode, forming a second electrode on the first insulating film, forming a second insulating film on the second electrode, forming pixel electrodes electrically connected to the first and second electrodes for forming a magnetic field on the second insulating film and having a light transmission area in the range of generated magnetic field, coating a magnetic fluid on the pixel electrode and the surface of the second insulating layer exposed to the light transmission area to a predetermined thickness, freezing the magnetic fluid, exposing the surface of the pixel electrode by polishing the magnetic fluid to a predetermined thickness, and fixing the front plate to the rear plate, keeping a predetermined distance therebetween.

To achieve the above objects, there is provided another method for manufacturing a display panel according to the present invention, comprising the steps of forming a plurality of signal lines for transmitting a display signal on the outer surface of the rear plate, forming a plurality of first electrodes in strips and linearly on the inner surface of the rear plate in a first direction, forming a first insulating film on the first electrode, forming a second electrode on the first insulating film, forming a second insulating film on the second electrode, forming through holes in which contact layers for electrically connecting the first and second electrodes to the signal lines formed on the outer surface of the rear plate are formed on the substrate, forming pixel electrodes electrically connected to the first and second electrodes for forming a magnetic field on the second insulating film and having a light transmission area in the range of generated magnetic field, coating magnetic fluid on the pixel electrode and the surface of the second insulating layer exposed to the light transmission area, freezing the magnetic fluid, exposing the surface of the pixel electrode by polishing the magnetic fluid to a predetermined distance, and fixing the front plate to the rear plate, keeping a predetermined distance therebetween.

BRIEF DESCRIPTION OF THE DRAWINGS

The above objects and advantages of the present invention will become more apparent by describing in detail a preferred embodiment with reference to the attached drawings in which:

FIGS. 31 through 42 show the manufacturing processes of an embodiment of the display panel according to the present invention.

DETAILED DESCRIPTION OF THE INVENTION

Hereinafter, embodiments of a display panel according to the present invention will be described in detail with reference to the attached drawings.

Embodiment 1

Figure 1:
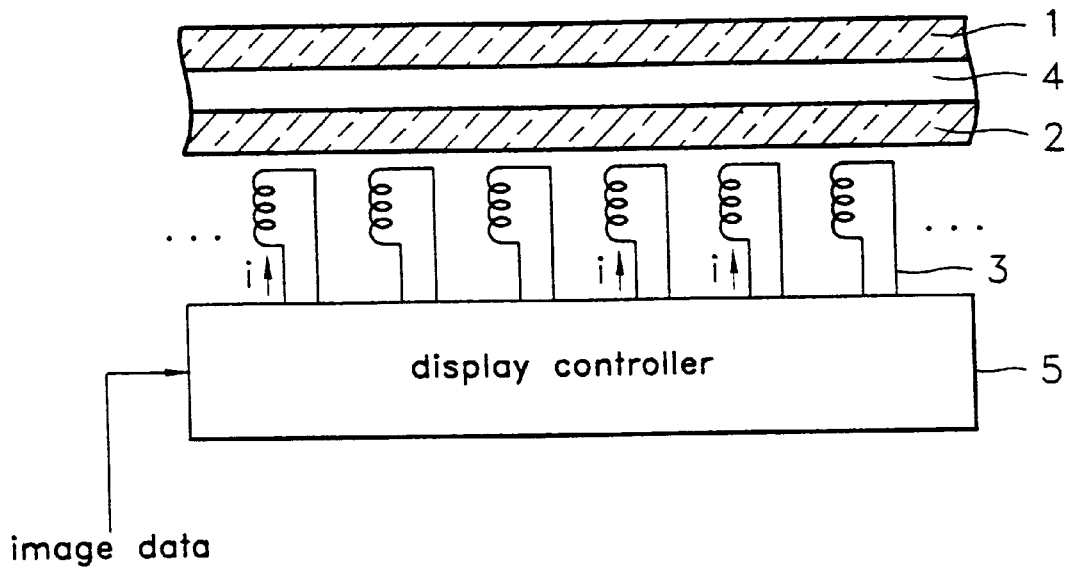
FIGS. 1 and 2 are the schematic sectional views of a conventional magnetic fluid display panel.
Figure 2:
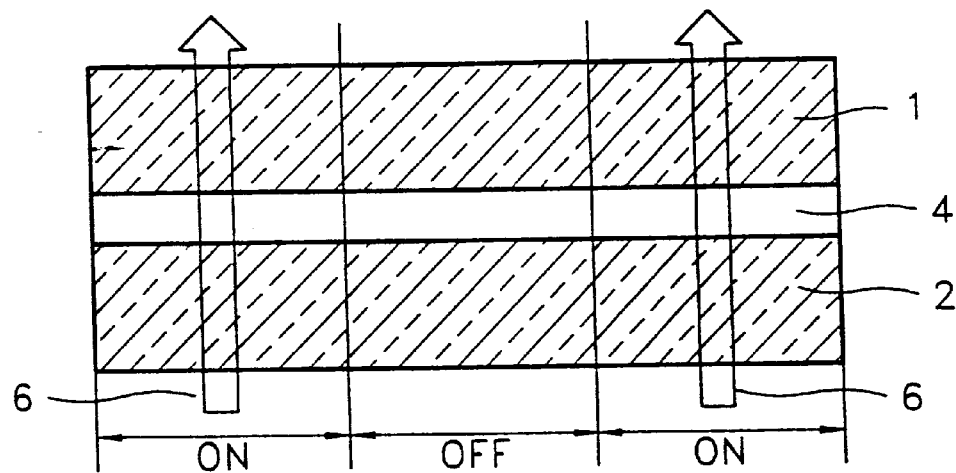
Figure 3:
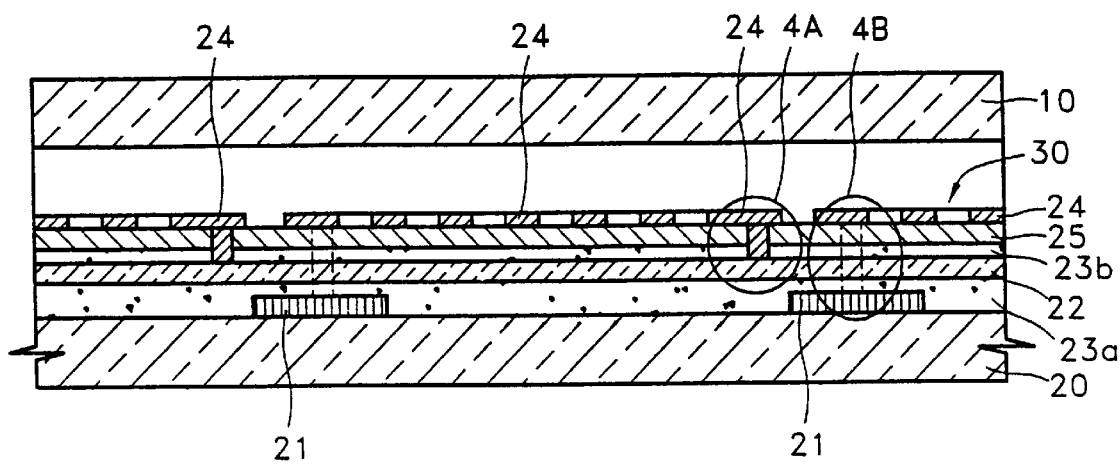
FIG. 3 is a partial sectional view of the first embodiment of a magnetic fluid display panel according to the present invention.
Figure 4A:
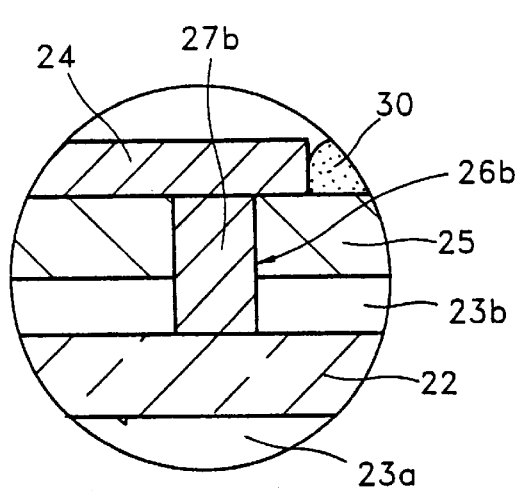
FIG. 4A is the enlarged view of the portion of FIG. 3.
Figure 4B:
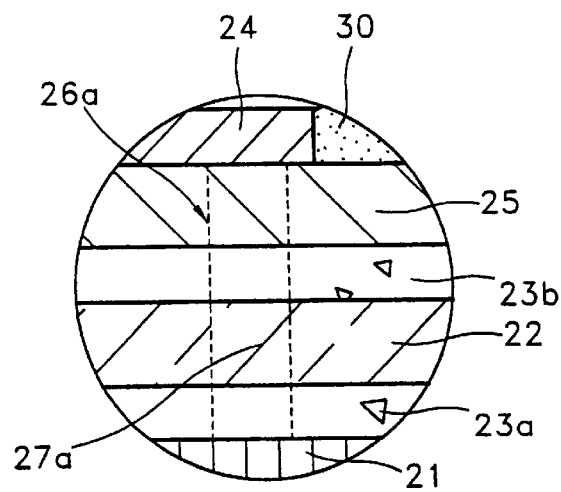
FIG. 4B is the enlarged view of the portion B of FIG. 3.

Referring to FIG. 3, a front panel 10 and a rear plate 20 of a transparent material are disposed spaced apart from each other by a predetermined distance. A plurality of first electrodes 21 are arranged in parallel on the inner surface of the rear plate 20 in a first direction, separated from each other by a predetermined distance. A plurality of second electrodes 22 are arranged in parallel on the first electrodes 21 in a direction perpendicular to the first direction, with a first insulating layer 23a interposed therebetween. A second insulating layer 23b and a ferromagnetic shield layer 25 are disposed subsequently on the second electrode 22. Here, the second insulating layer 23b may be omitted when the ferromagnetic shield layer 25 is insulating but is essential for electrical insulation when the ferromagnetic shield layer 25 is not used. A pixel electrode 24 electrically connected to the first electrode 21 and the second electrode 22 is positioned on the ferromagnetic shield layer 25. Each end of the pixel electrode 24 are electrically connected to the first electrode 21 and the second electrode 22 in the lower portions. As shown in FIG. 4A, one end of the pixel electrode 24 is electrically connected to the second electrode 22 through the contact layer 27b of the through hole 26b. As shown in FIG. 4B, the other end of the pixel electrode 24 is electrically connected to the contact layer 27a of the through hole 26a.

Figure 5:
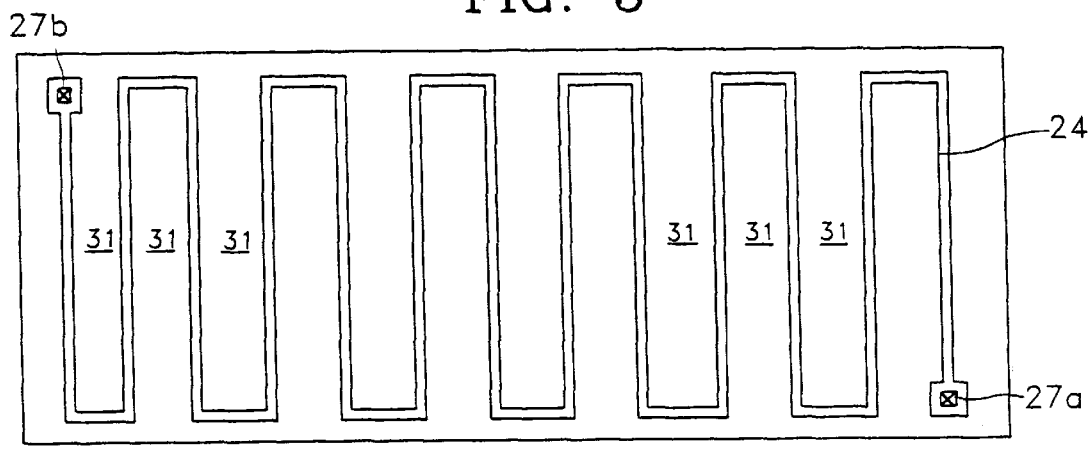
FIG. 5 is an enlarged and partial plan view of a pixel electrode applied to the first embodiment of the present invention shown in FIG. 3.

The pixel electrode 24 has a zigzag shape on the second insulating layer as shown in FIG. 5 and its ends contact the first and second contact layers 27a and 27b.

Figure 6:
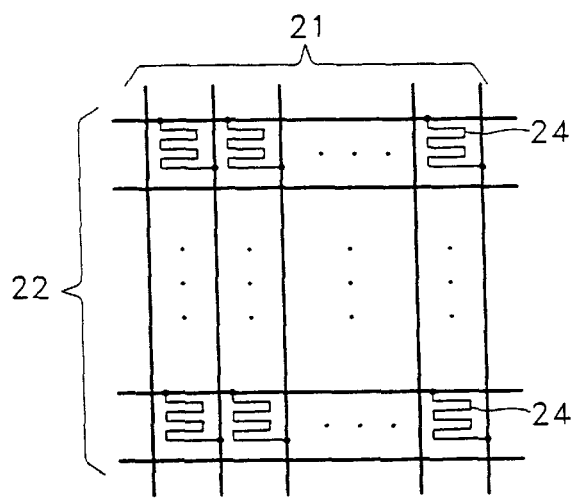
FIG. 6 shows the electrode arrangement of the first embodiment of the present invention.

The display panel according to the present invention having the above-mentioned structure has an X-Y matrix type electrode arrangement as shown in FIG. 6. The pixel electrode 24 generates a magnetic field around the electrode by the electrical current applied by the first electrode 21 and the second electrode 22, and the light passing through the light transmission area 31 is modulated by the magnetic field which pulls the magnetic fluid 30 blocking the light in the light transmission area 31 into the vicinity of the electrode surface. That is, when a current is applied to the pixel electrode, the magnetic fluid polarizes due to the magnetic field formed around the electrode. At this time, since the magnetic field is stronger near the pixel electrode 24, a force the direction of the body of the pixel electrode 24 is applied to the magnetic fluid and, therefore, the magnetic fluid 30 is displaced in the direction of the pixel electrode 24. FIG. 7B shows a state in which light transmission is prevented since the current is not applied to the pixel electrode 24, and therefore, the magnetic fluid 30 remains in the light transmission area 31 due to the surface tension of the magnetic fluid 30 and surface force of the light transmission area 31.

Figure 7A:
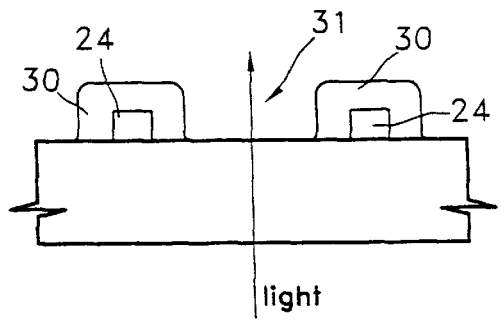
FIGS. 7A and 7B show the movement of the magnetic fluid by the driving of the pixel electrode of the display panel according to the present invention.
Figure 7B:
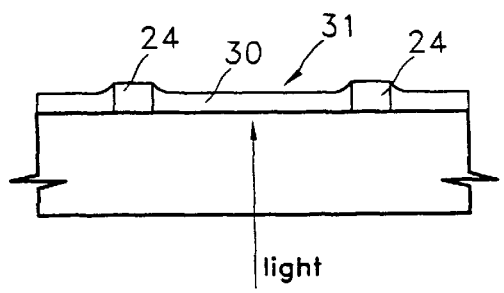

The magnetic fluid 30 stays separated from the front plate 10 and resides only on the rear plate 20 side as shown in FIGS. 7A and 7B. The magnetic fluid 30 controls the light transmission through the light transmission area 31 by moving between the exposed surface of the light transmission area 31 of the pixel electrode 24 and the surface of the pixel electrode 24 according to the activation or non-activation of the pixel electrode 24 as mentioned above. Apparently, the distance between the front plate 10 and the rear plate 20 is to be controlled by a spacer arranged therebetween so that the magnetic fluid 30 does not contact the front plate 10 when the magnetic fluid 30 is moved to the surface of the pixel electrode 24 as mentioned above. According to experiments, it is preferable to make the distance between the front plate 10 and the rear plate 20, the height (the thickness) of the pixel electrode 24, the linewidth of the pixel electrode 24, the width of the light transmission area 31, and the thicknesses of the first electrode 21 and the second electrode 22 to be, for example, 30 $\mu$m, 3 $\mu$m, 3 $\mu$m, 10 $\mu$m, and 1 $\mu$m, respectively. In addition, it is preferable to provide a ferromagnetic shield layer in order to minimize distortion due to interference between signals.

Embodiment 2

Figure 8:
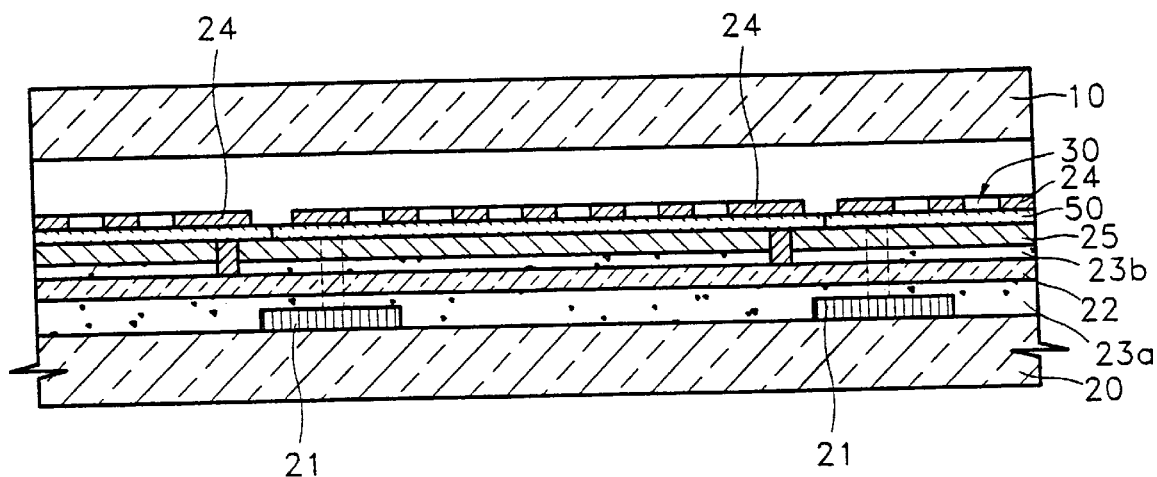
FIG. 8 is the schematic sectional view of the second embodiment of the present invention in which a color filter layer is prepared under the pixel electrode.
Figure 9:
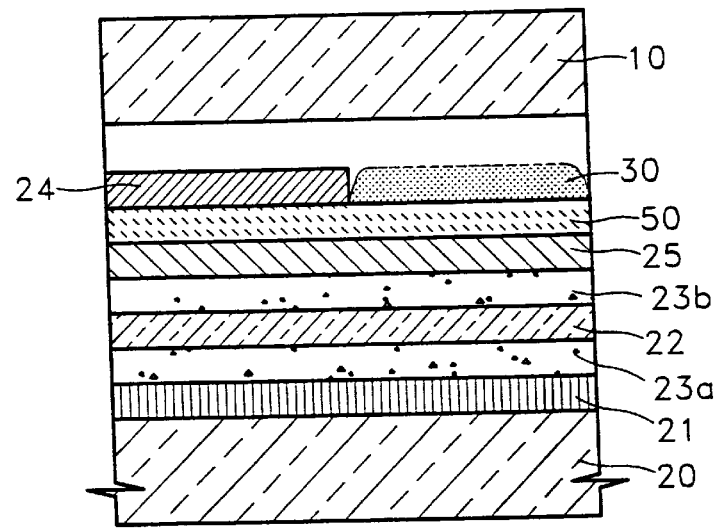
FIG. 9 is an enlarged and partial view of FIG. 8.

FIG. 8 shows the second embodiment of the present invention in which a color filter layer 50 is arranged under the pixel electrode 24. Other than the addition of the filter layer 50, the structure of the second embodiment is identical to that of the first embodiment shown in FIG. 3. FIG. 9 is a partial enlarged view of FIG. 8.

Figure 10:
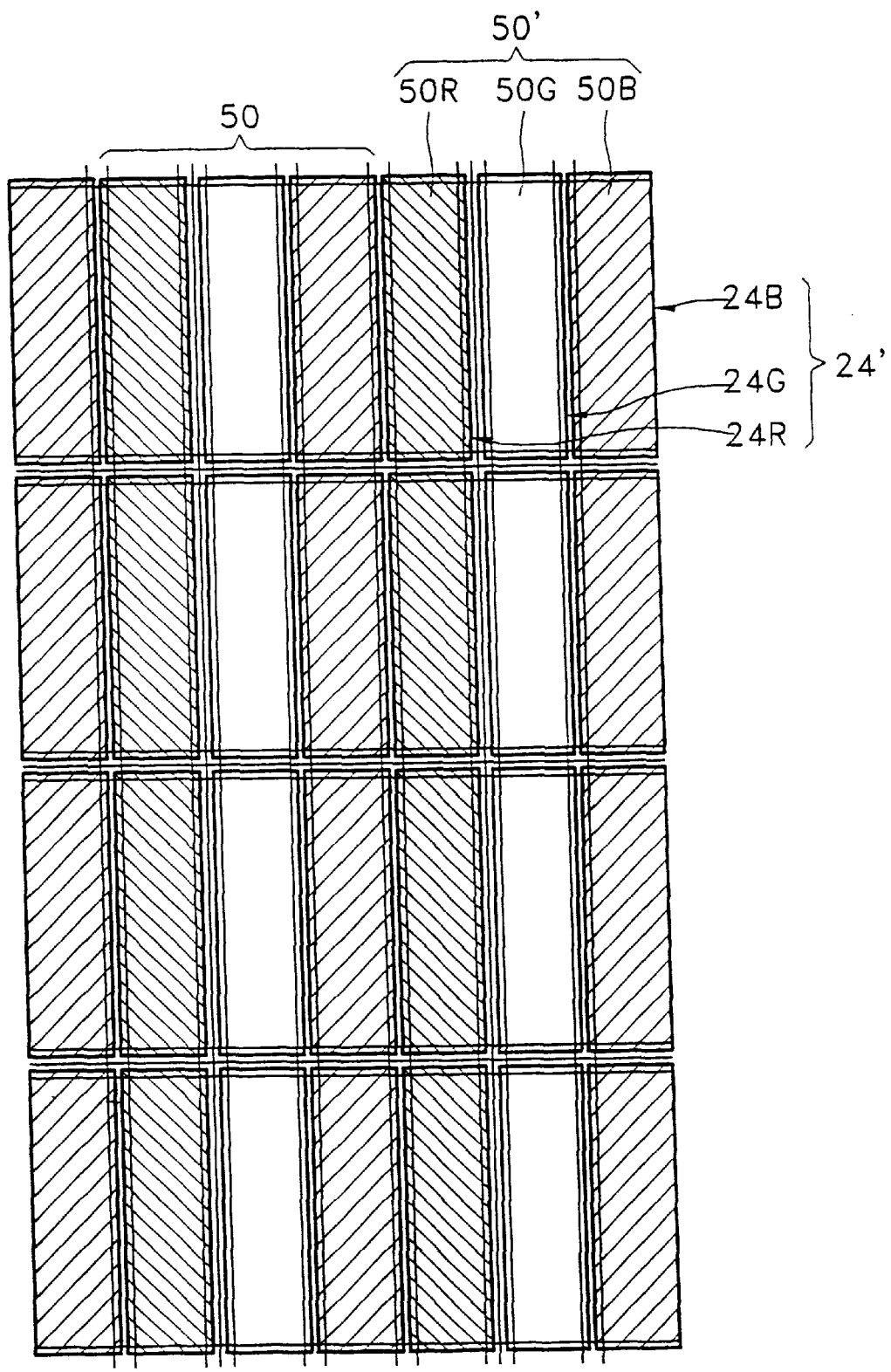
FIG. 10 shows the arrangement of the pixel electrode of the second embodiment of the present invention shown in FIG. 8.

FIG. 10 shows the arrangement of the pixel electrode to realize color pictures, in which one set of pixel electrodes 24' is comprised of three unit pixel electrodes 24R, 24G, and 24B, and a set of color filters 50' is comprised of color filters 50R, 50G, and 50B corresponding to the unit pixel electrodes 24R, 24G, and 24B. The concept of driving the unit pixel electrodes of the respective pixel sets is identical to that in a conventional color liquid crystal display.

A reflective type display panel, which is the most preferable form of the magnetic fluid display panels according to the present invention, can be obtained when the light reflectivity is provided by the ferromagnetic shield layer or the color filter. For example, when the color filter is replaced by a colored reflector, light of a specific wavelength in the light incident on the color reflector is reflected, thus generating a color picture of a reflective type. By doing so, it is possible to mount circuit components for display on the back surface of the rear plate. In particular, a large screen can be constructed by combining a plurality of display panels because an electrical signal to the first electrode and the second electrode can be applied via the through holes prepared in the rear plate.

Embodiment 3

Figure 11:
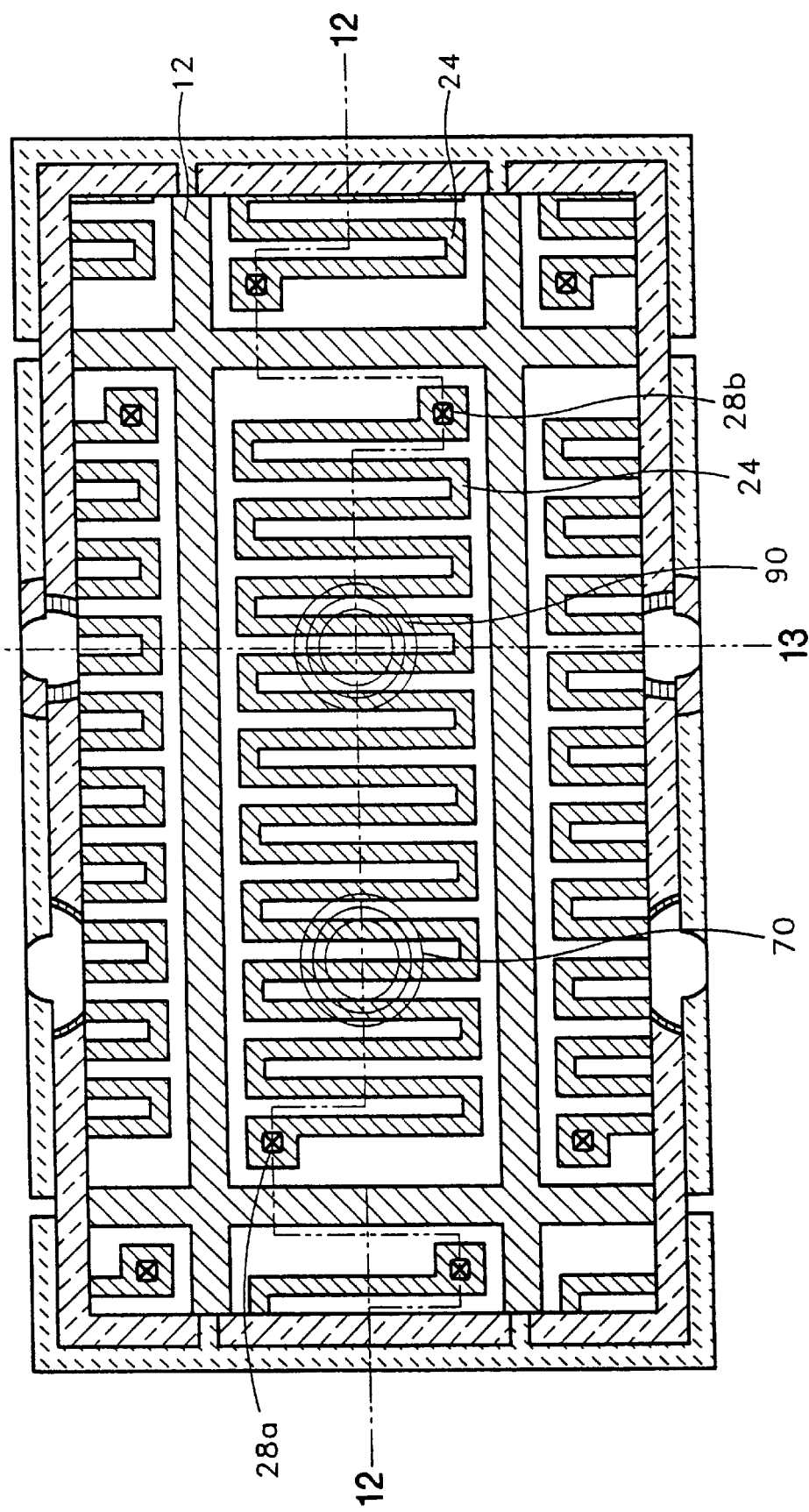
FIG. 11 is an extracted plan view showing the arrangement of the pixel electrode with respect to the rear plate of the third embodiment of the present invention in which a color reflective layer is prepared under the pixel electrode.

Referring to FIG. 11, pixel electrodes 24 are arranged in an array. The first and second contact layers 28a and 28b for the electrical contact between the pixel electrode 24 and the first electrode 21 and the second electrode 22, which are positioned in the lower portion of the pixel electrode 24, are positioned at each end of the pixel electrode 24. Also, first and second contact columns 90 and 70, which provide electrical contact between the first and the second electrodes 21 and 22 and the signal lines 61 and 71, described later, are located underneath the pixel electrode 24 filling the through holes.

Figure 12:
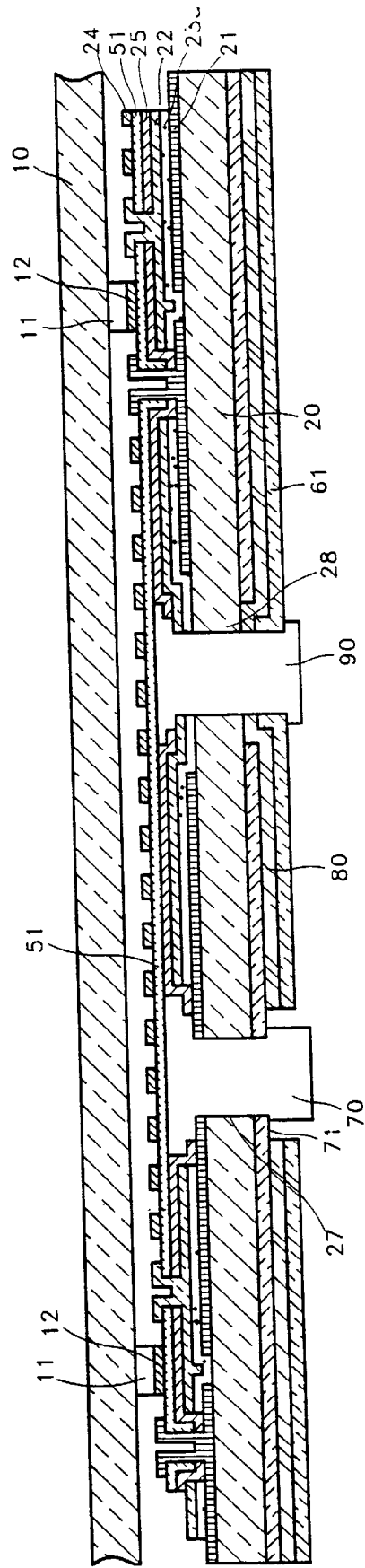
FIG. 12 is a sectional view taken along the line 12—12 of FIG. 11.
Figure 13:
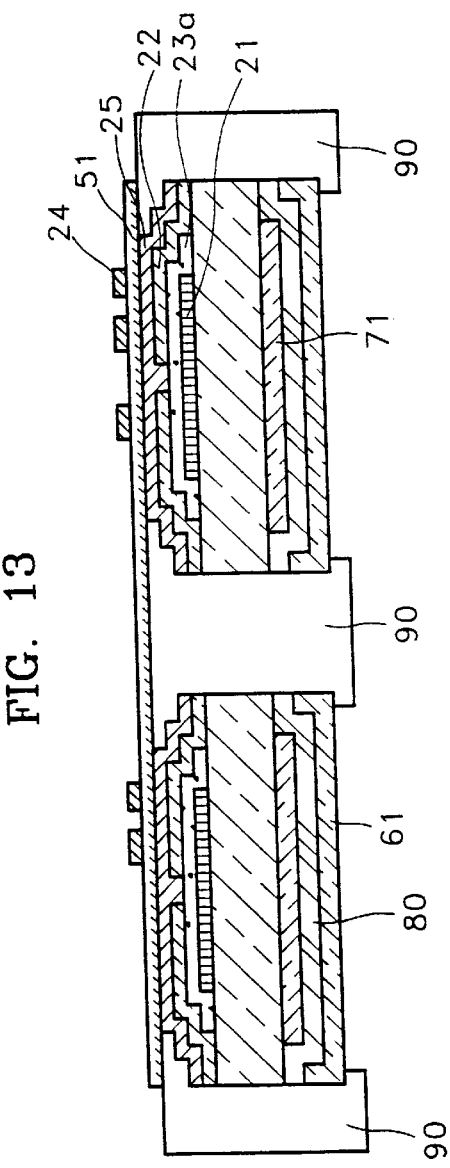
FIG. 13 is a sectional view taken along the line 13—13 of FIG. 11.

Referring to FIGS. 12 and 13, the front plate 10 a transparent material, and the rear plate 20, a transparent or opaque material, are separated from each other by a predetermined distance. The distance between the front plate 10 and the rear plate 20 is maintained by spacer layers 11 and 12, which are located between the front and rear plates 10 and 20 and connected to each other. Here, the first spacer layer 12 of the rear plate 20 is formed during the formation of the pixel electrode 24 and the upper and lower spacer layers 11 and 12 are combined with each other by adhesives or pressure welding or cold pressure welding. A plurality of first electrodes 21 are arranged in parallel in a first direction separated from each other by a predetermined distance on the inner surface of the rear plate 20. A plurality of second electrodes 22 are arranged in parallel on and perpendicular to the first electrodes 21 with an insulating layer 23a interposed therebetween. A ferromagnetic shield layer 25 formed of an insulating material is positioned on the second electrodes 22. A color reflective film 51 is formed on the ferromagnetic shield layer 25, on which the pixel electrode 24, electrically connected to the first electrode 21 and the second electrode 22, is formed. At this time, the ends of the pixel electrode 24 are electrically connected to the first electrode 21 and the second electrode 22 by the contacts 27a and 27b filling the through holes 26a and 26b. The first electrode 21 and the second electrode 22 are electrically connected to the first and second signal lines 71 and 61, formed on the backside of the rear plate 20, through the contact layers 70 and 90 filling the through holes 27 and 28 of the rear plate 20. An electrically insulating layer 80 is interposed between the first signal line 71 and the second signal line 61.

Figure 14:
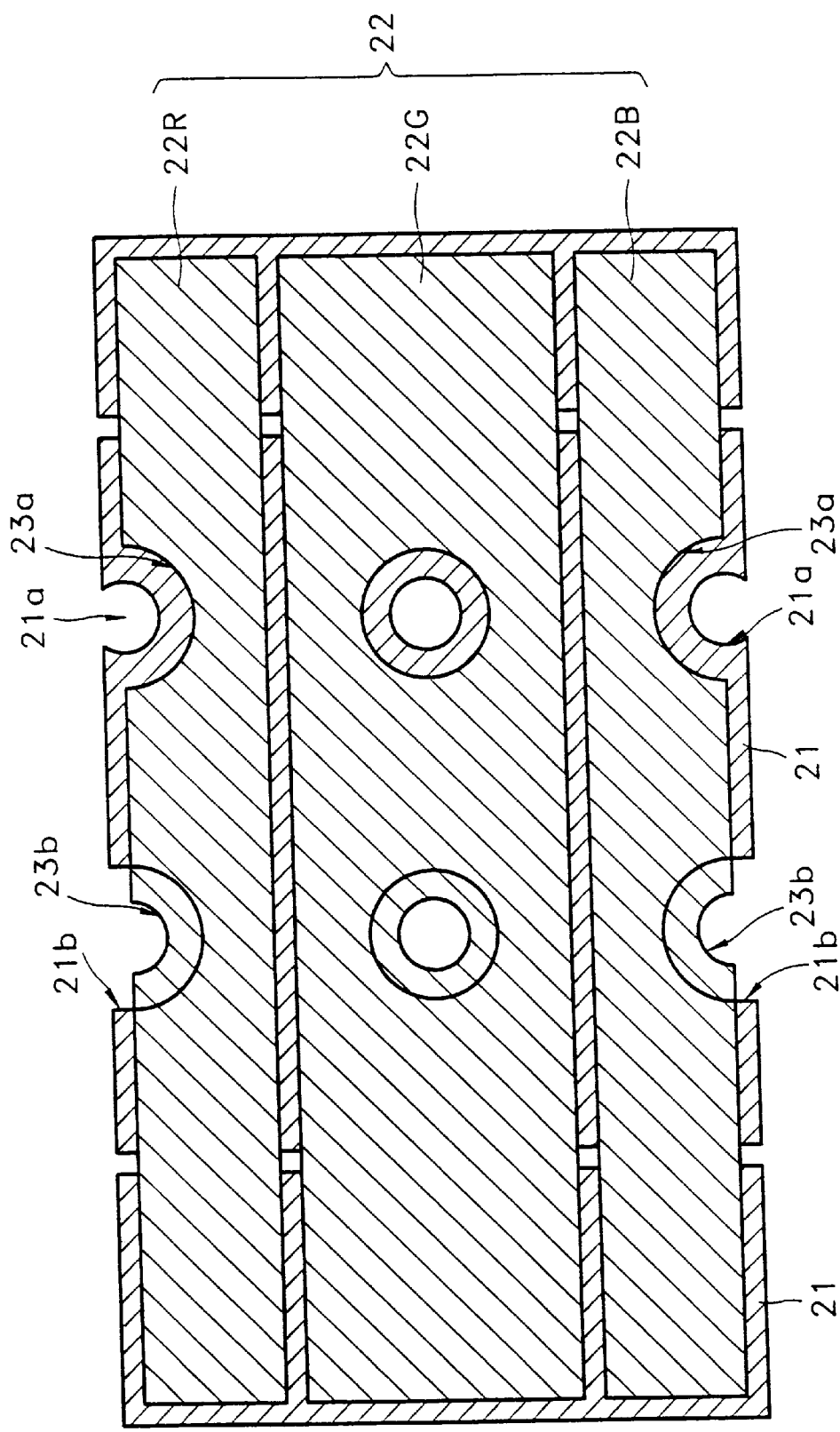
FIG. 14 is a plan view showing the relative positional relationship between the first electrode and the second electrode of the third embodiment of the present invention.

Referring to FIG. 14, the first electrode 21 is arranged perpendicular to the second electrode 22 and the set of the second electrodes 22 is comprised of three unit electrodes 22R, 22G, and 22B for a color display panel.

Small and large through holes 21a and 21b in the first electrodes 21 are separated from each other by a predetermined distance. The through holes 23a and 23b corresponding to the through holes 21a and 21b are located in the second electrodes 22R, 22G, and 22B. The small through holes are for making electrical contact to the corresponding contact hole fillings and the large through holes prevent contact hole with the contact fillings.

Embodiment 4

Figure 15:
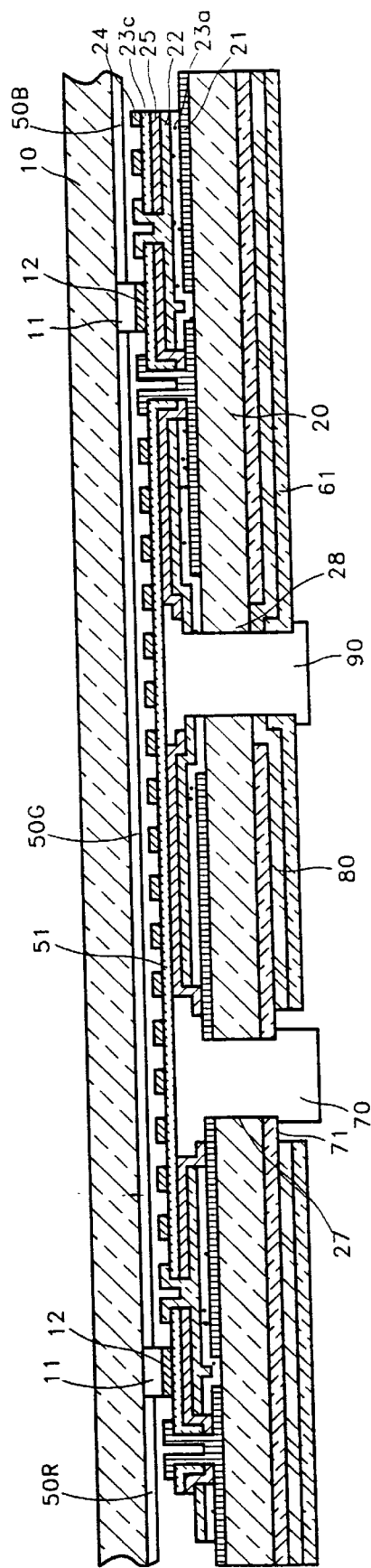
FIG. 15 is the schematic sectional view of the fourth embodiment of the present invention in which a color filter is prepared on a front plate side.

Means for realizing a color picture, i.e., the color filter layer or the color reflective film, are located on the rear plate 20 side in the first through third embodiments. However, in this embodiment, the means for realizing the color picture is located on the surface of the front plate 10. Referring to FIG. 15, the color filters 50R, 50G, and 50B, corresponding to the respective pixel electrodes, are located on the inner surface of the front plate 10 and a spacer 11 of a predetermined height is located between the color filters 50. An insulating film 23C is located on the ferromagnetic shield layer 25. The insulating film 23c is replaced with a color reflective film 51 in the structure of FIG. 12, described as the third embodiment. The insulating film 23c for electrical insulation between electrical elements in the lower portion is an optional element which can be omitted when the ferromagnetic shield layer and the electrical elements in the lower portion are appropriately planned and designed so that the electrical elements in the lower portion are electrically insulated by the ferromagnetic shield layer 25 located in the lower portion. The other elements have the same structural arrangement as that of the third embodiment.

Embodiment 5

Figure 16:
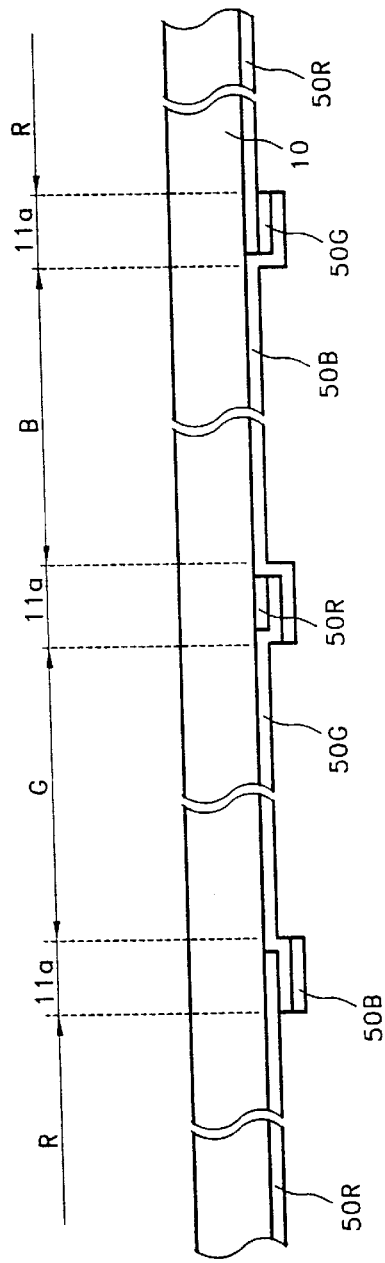
FIG. 16 is a partial sectional view of a front plate in the fifth embodiment of the present invention in which a spacer is formed by a color filter.

In the fifth embodiment of the present invention, a spacer layer 11a on the front plate 10 is produced during the process for forming a red color filter 50R, a green color filter 50G, and a blue color filter 50B, and the fabrication of the elements on the rear plate 20 side is identical to that of the fourth embodiment shown in FIG. 15. Referring to FIG. 16, the spacer layer 11a is produced by overlapping the color filters 50R, 50G, and 50B in the boundary regions of the respective areas R, G, and B. The pixel electrode 24 preferably has a dark color, such as black, so that light which passed through an area other than the spacer layer is not reflected from the electrode surface in order to obtain high contrast ratio.

Light reflectance is obtained by the highly reflective first and second electrodes, if the insulating layer and the ferromagnetic shield layer are not reflective.

Figure 17A:
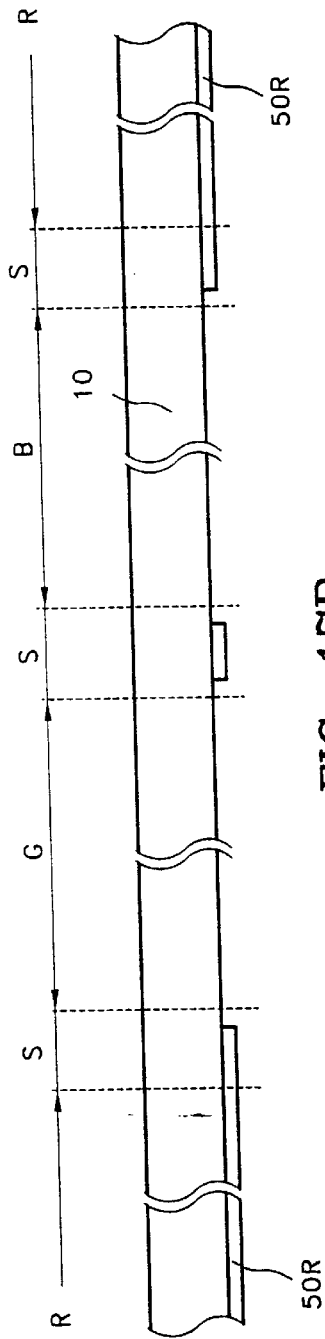
FIGS. 17A through 17C show processes for forming the color filter layer and the spacer layer of FIG. 16.
Figure 17B:
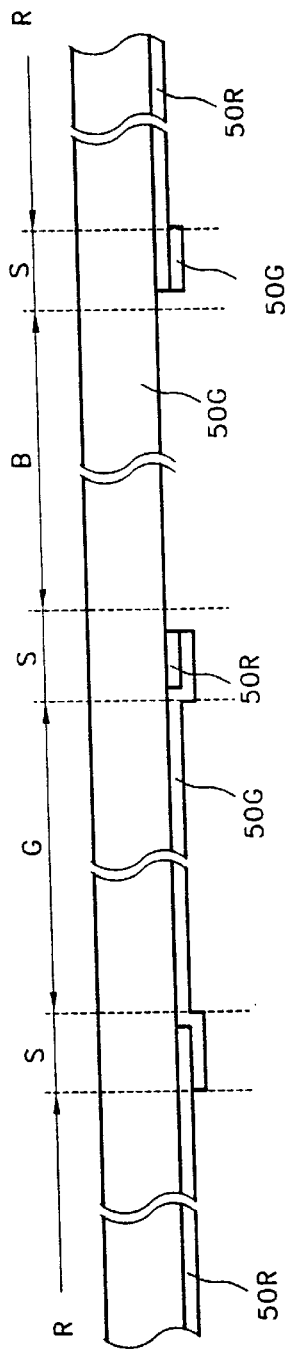
Figure 17C:
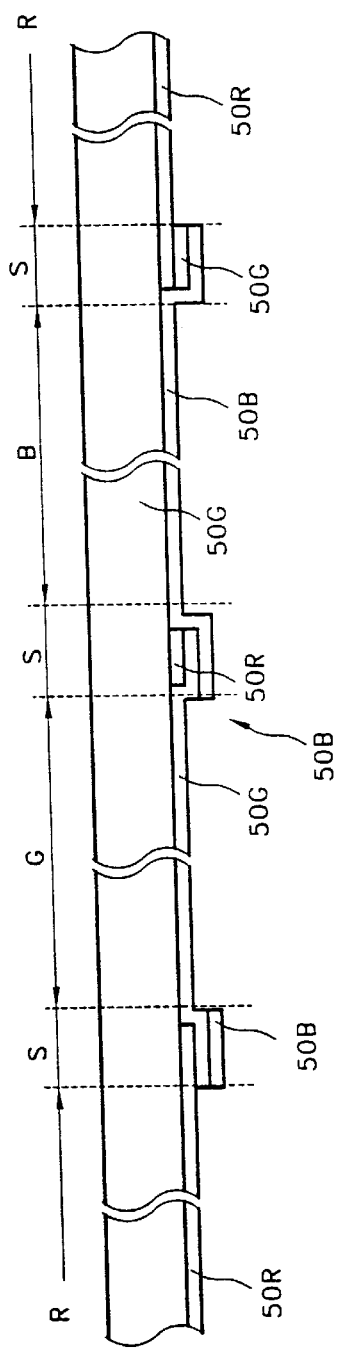

FIGS. 17A through 17C show processes for forming the color filter layer and the spacer.

As shown in FIG. 17A, the red filter layer 50R is formed in an area R and an area S in which the spacer layer is prepared.

As shown in FIG. 17B, the green filter layer 50G is formed in an area G and the area S.

As shown in FIG. 17C, the blue filter layer 50B is formed in an area B and the area S.

The above-mentioned color filter layers can be patterned in an ordinary process for forming a thin film using, for instance, photolithography. The spacer layer can thus be formed without an additional process for forming a thin film.

Embodiment 6

Figure 18:
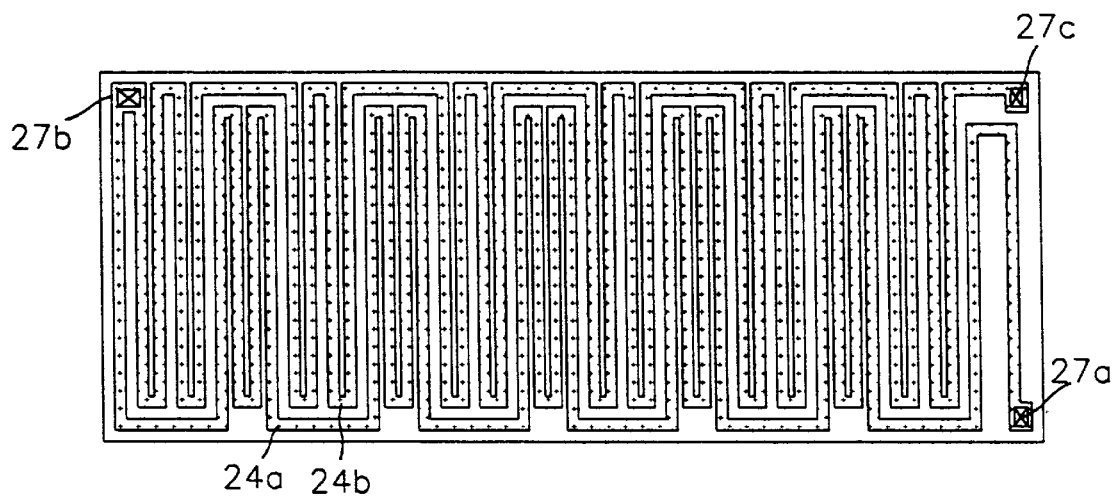
FIG. 18 is a partial plan view of the pixel electrode of the sixth embodiment of the present invention in which the pixel electrode includes two sub-pixel electrodes.

FIG. 18 shows embodiment 6 of the present invention in which the operation of the pixel can be improved by driving the magnetic fluid more efficiently using a magnetic field with an enhanced field gradient and by increasing the light reflectivity using the pixel electrodes as light reflectors. In FIG. 18, reference numerals 27a, 27b, and 27c denote a first contact layer, a second contact layer, and a third contact layer, respectively. In this embodiment, the unit pixel includes two sub-pixel electrodes. Reference numeral 24a denotes the first sub-pixel electrode connected to the first contact layer 27a and the second contact layer 27b and reference numeral 24b denotes a second sub-pixel electrode connected to the second contact layer 27b and the third contact layer 27c. Three signal lines are required for driving the first sub-pixel electrode and the second sub-pixel electrode. A third electrode in line with one of the first electrode and the second electrode, for instance the first electrode, is required. In this case, the first sub-pixel electrode can be electrically connected to the first electrode and the second electrode and the second sub-pixel electrode 24b can be connected to the second electrode and the third electrode. Since such a structural plan can be easily designed using the embodiments described above and general technologies, detailed explanations are omitted.

Figure 19A:
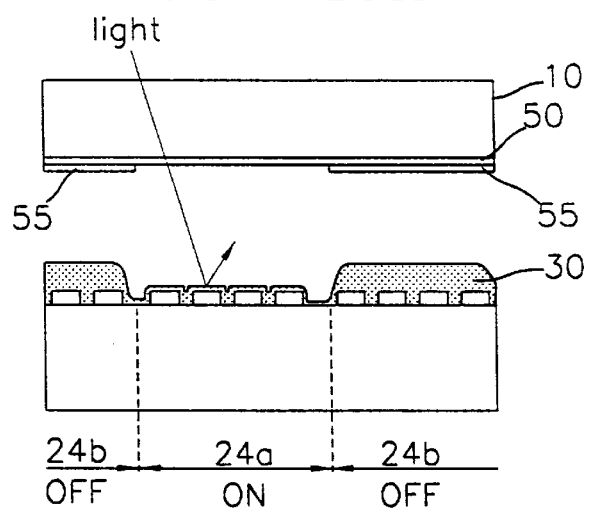
FIGS. 19A and 19B are the schematic extracted sectional views of the sixth embodiment of FIG. 18 showing the operating state of the pixel.
Figure 19B:
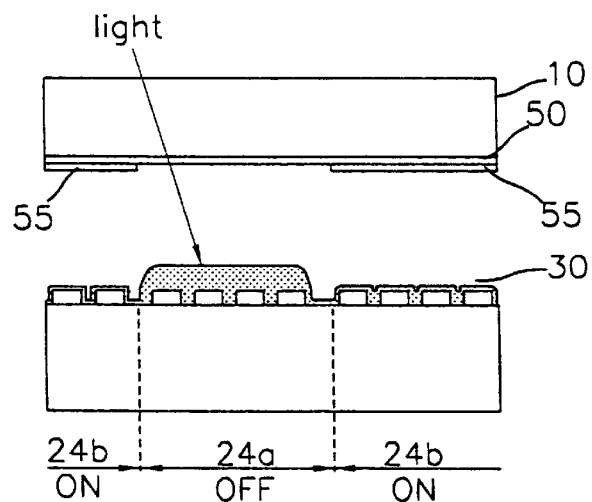

In FIGS. 19A and 19B, reference numeral 55, under the color filter 50 of the front plate 10, denotes a light blocking layer corresponding to the mass portion of the second sub-pixel electrodes 24b. Therefore, a plurality of light blocking layers 55 are formed in one unit pixel. In the case of the pixel electrode in FIG. 18, six light blocking layers 55 are formed. In the unit pixel having the above structure, when current is applied to the first sub-pixel electrode 24a, a strong magnetic force is generated in the magnetic fluid residing on the first sub-pixel electrode 24a and the magnetic fluid is forced to move onto the second sub-pixel electrode 24b. When current is applied to the second sub-pixel electrode 24b, a strong magnetic force is generated in the magnetic fluid on the second sub-pixel electrode 24b and the magnetic fluid is forced to move onto the first sub-pixel electrode 24a. Since the switching between on and off states of the pixel are performed by a magnetic field, the operational speed in the present embodiment can be faster than in the embodiments in which only the off-to-on switching is performed by the magnetic field. If a metal is used as the pixel electrodes, the brightness of the pixel can be improved since light is reflected from the surface of the pixel electrode. Additionally, it is easy to maintain a thick magnetic fluid on the electrodes since a magnetic fluid can be supported by walls as will be manufactured later.

As shown in FIG. 19A, applying current to the first sub-pixel electrode 24a, the magnetic fluid is pushed out to the second sub-pixel electrode 24b, to which current is not applied, since a strong magnetic field with a large gradient of field strength is formed around the first sub-pixel electrode 24a and acts on the magnetic fluid 30 in the vertical direction, toward the first sub-pixel electrode 24a. Therefore, the magnetic fluid on the first sub-pixel electrode 24a area becomes thinner and, on the second sub-pixel electrode 25b, becomes thicker. When a strong magnetic field is formed around the second sub-pixel electrode 24b by the application of current to the second sub-pixel electrode as shown in FIG. 19B, the magnetic fluid is pushed out to the first sub-pixel electrode 24a to which current is not applied since pressure in the magnetic fluid on the second sub-pixel area acts in the vertical direction, toward the second sub-pixel electrode 24b. Therefore, the magnetic fluid on the second sub-pixel electrode 24b becomes thinner and, on the first sub-pixel electrode 24a, becomes thicker.

In these two states, the reflectivity of the light incident on the pixel varies as shown in FIGS. 19A and 19B. When the magnetic fluid 30 residing on the first sub-pixel electrode 24 becomes thinner, the corresponding pixel becomes brighter since more of the light is reflected by the first sub-pixel electrode. When the magnetic fluid 30 on the first sub-pixel electrode 24a becomes thicker, the corresponding pixel remains dark since the reflection of light in the first sub-pixel electrode 24a is reduced. The reflectivity from the second sub-pixel electrode 24b of the off area is high, so the corresponding pixel remains dark regardless of the operation of the pixel electrode since light does not reach the second sub-pixel electrode 24b due to the light blocking layers.

Embodiment 7

Figure 20:
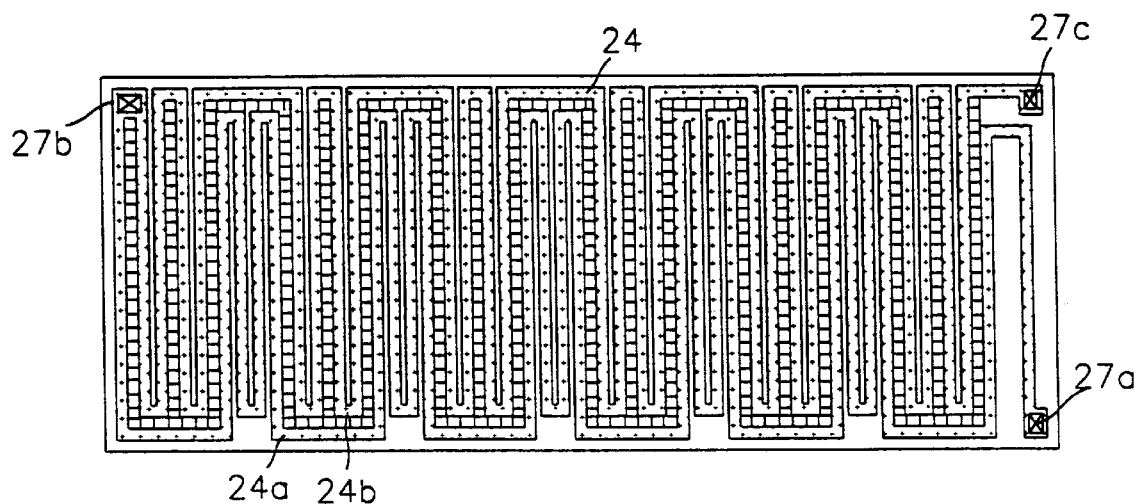
FIG. 20 is the extracted plan view of the pixel electrode of the seventh embodiment of the present invention in which a wall is formed along the boundary of the sub-pixel electrodes.
Figure 21:
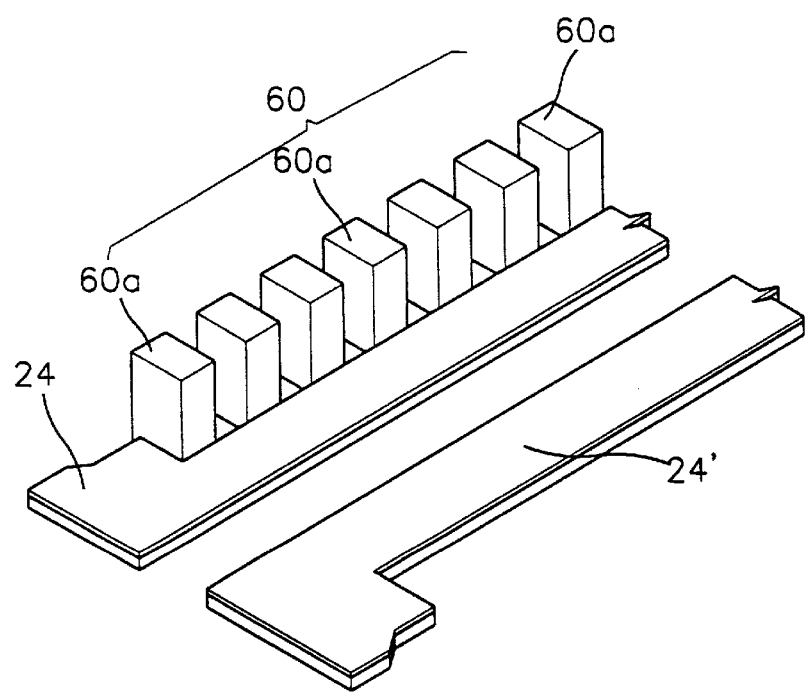
FIG. 21 is a partial perspective view showing the structures of the wall and the sub-pixel electrode of the seventh embodiment of the present invention.

In the embodiment shown in FIG. 20, walls 60 for supporting the magnetic fluid film by capillarity are formed with a predetermined height along the gap area between the first sub-pixel electrode 24a and the second sub-pixel electrode 24b. Thus, a film of the magnetic fluid which is thicker than that height can be maintained on the surfaces of the sub-pixel electrodes in embodiment 6. The wall 60 consists of an array of dielectric columns 60a spaced apart by a predetermined distance along the gap area as shown in FIG. 21. The wall 60 can also be formed in a continuous pattern. The wall 60 including of an array of columns as shown in FIG. 21 is preferable in order to reduce the resistance to the flow of the magnetic fluid 30 because the wall is located in the middle of the moving path of the magnetic fluid 30. The flowing of the magnetic fluid 30 from one area to the other is hindered by the presence of the wall.

Figure 22A:
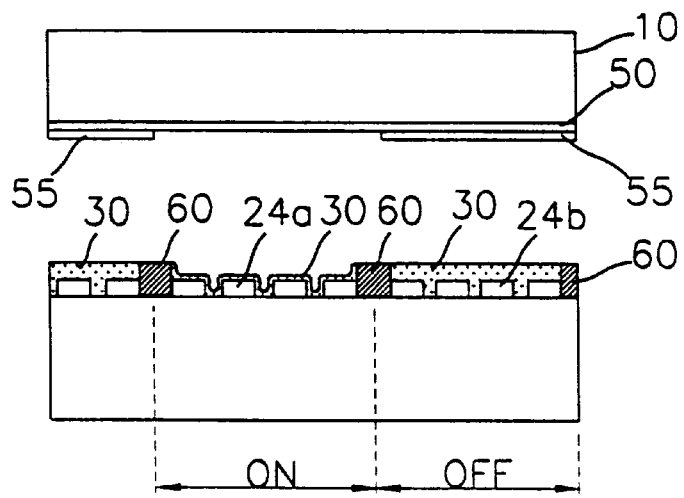
FIGS. 22A and 22B are the schematic partial sectional views of the seventh embodiment of FIG. 20 showing the operating state of the pixel.

Referring to FIG. 22A, current is applied to the first sub-pixel electrode 24a and the magnetic fluid 30 in the mass region of the first sub-pixel electrodes 24a moves into the mass region of the second sub-pixel electrodes 24b by the operation described in the embodiment6, over the wall 60 or through the spaces between the columns.

Figure 22B:
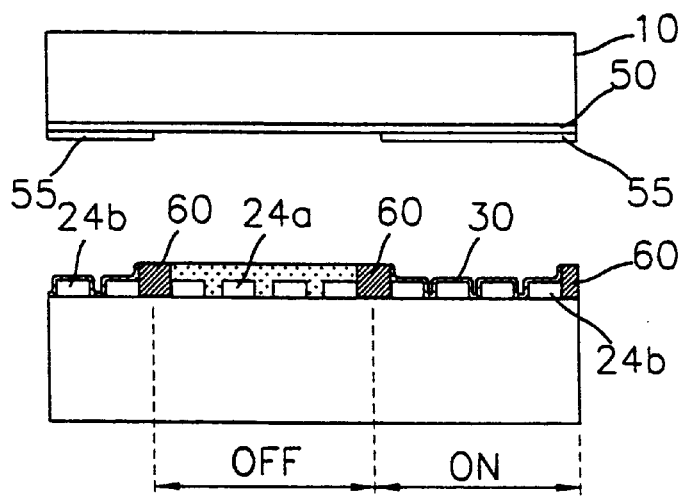

On the other hand, when current is applied to the second sub-pixel electrode 24b as shown in FIG. 22B, the magnetic fluid is moved from the mass region of the second sub-pixel electrodes 24b to the mass region of the first sub-pixel electrodes 24a by, strong forced as mentioned above, over or through the wall.

Embodiment 8

Figure 23:
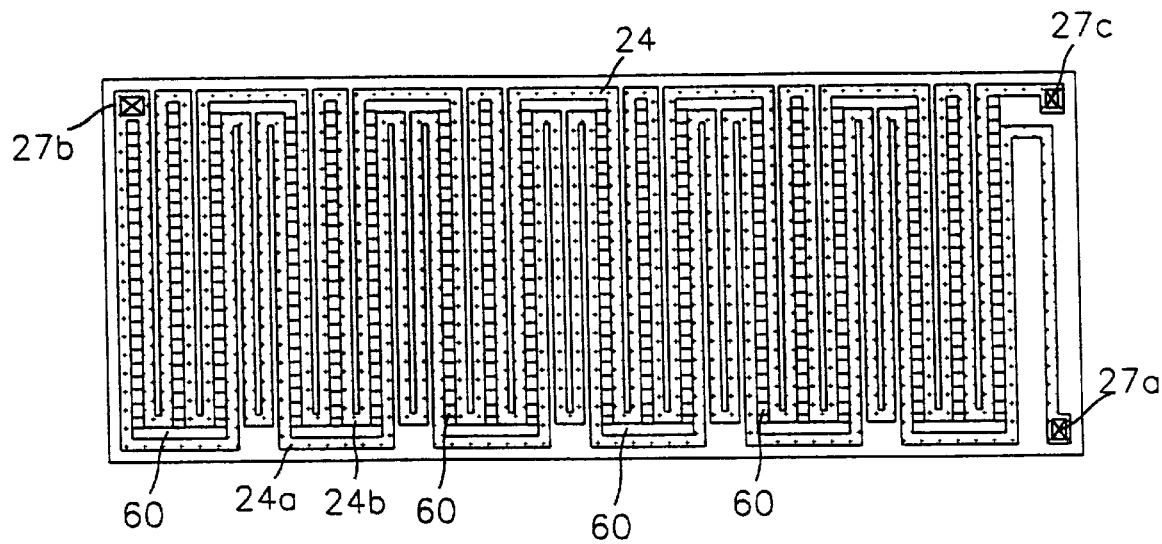
FIG. 23 is the extracted plan view of the pixel electrode of the eighth embodiment of the present invention in which a wall is formed in the middle of an area in which the sub-pixel electrodes are integrated.
Figure 24:
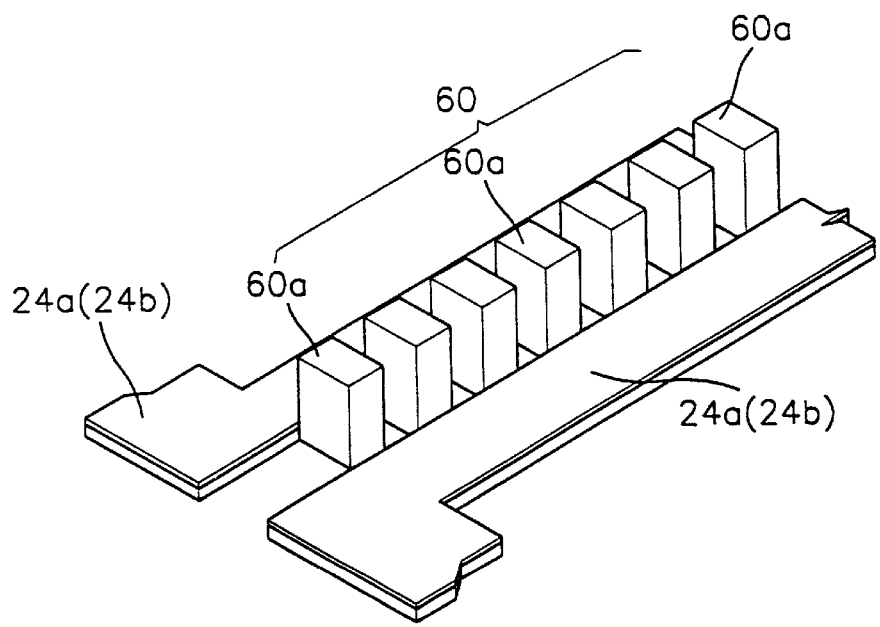
FIG. 24 is a partial perspective view showing the structures of the wall and the sub-pixel electrode of the eighth embodiment of the present invention.

In the embodiment 8 shown in FIG. 23, the location of the wall of embodiment 7 is changed. The wall 60 is located outside the moving path, i.e., in the middle of the mass region of the respective electrodes. That is, the walls 60 are respectively located in the middle of the mass regions of the first sub-pixel electrodes 24a and the second sub-pixel electrodes 24a as shown in FIG. 24.

Figure 25A:
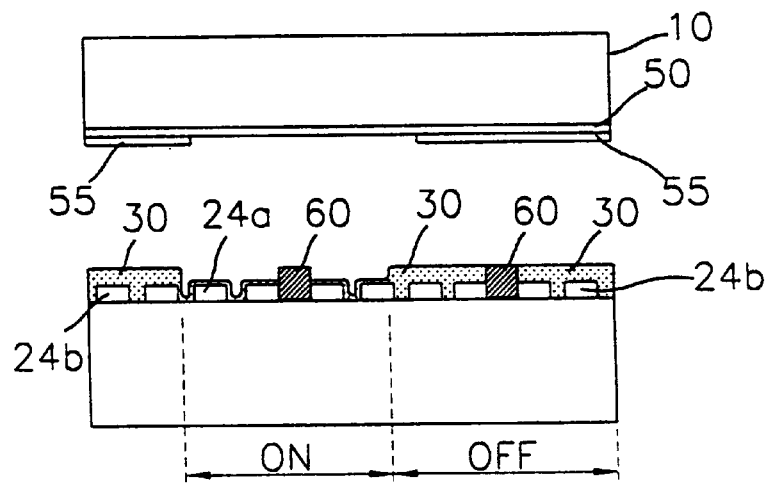
FIGS. 25A and 25B are the schematic partial sectional views of the eighth embodiment of FIG. 23 showing the operating states of the pixel.
Figure 25B:
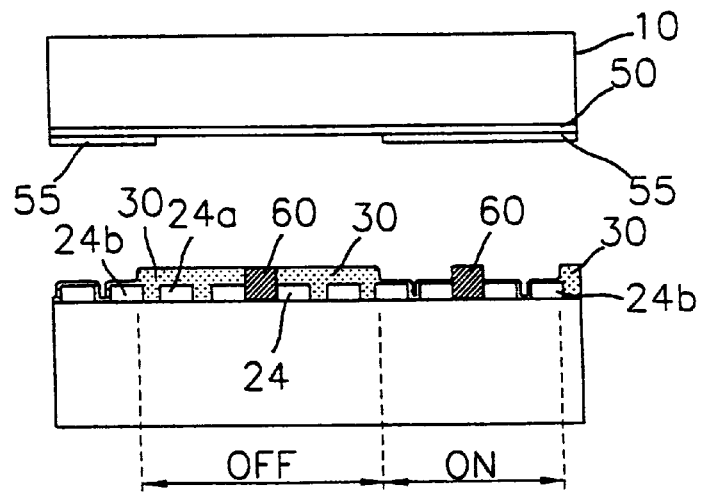

In this structure, the wall 60 provides adsorbing force to retain the magnetic fluid 30 which moved from the mass region of the adjacent pixel electrode to the mass region of the corresponding pixel electrode. The wall 60 holds the magnetic fluid 30 in the area (OFF) of the second sub-pixel electrode 24b, to which current is not applied, by the adsorbing force of the wall surfaces as shown in FIG. 25A. The area to which current is applied releases some of the magnetic fluid 30 since the force due to the strong magnetic field in the corresponding pixel electrode is greater than the adsorbing force of the wall 60. FIG. 25B shows a state in which current is applied to the second sub-pixel electrodes 24b and the magnetic fluid 30 stays in the area of the first sub-pixel electrodes 24a due to the above described operation and is held by the wall 60 in the first sub-pixel electrodes 24a.

Embodiment 9

Figure 26:
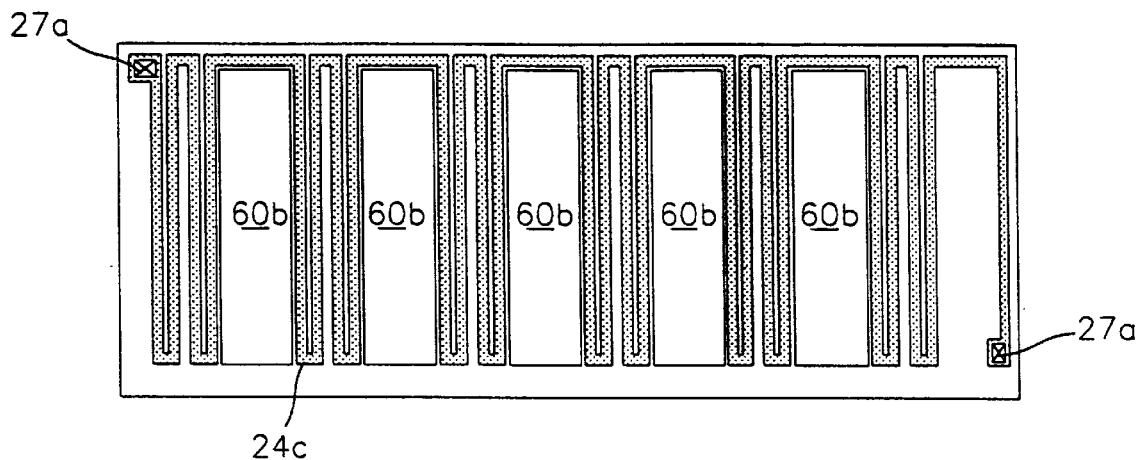
FIG. 26 is a partial plan view of the pixel electrode of the nineth embodiment of the present invention in which the pixel electrode forms integrated areas separated by a predetermined distance.

FIG. 26 shows an embodiment 9 in which the second sub-pixel electrodes 24b are removed from the structure of embodiments 6, 7, and 8 and walls 60b having predetermined area and height are formed in the empty spaces.

Referring to FIG. 26, pixel electrodes 24c connected to a first contact layer 27a and a second contact layer 27b form mass regions at the same distance and the walls 60b are located between the mass regions.

Figure 27A:
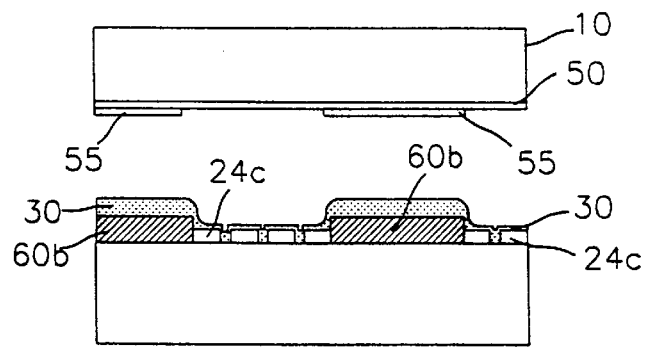
FIGS. 27A and 27B are schematic partial sectional views of the nineth embodiment of FIG. 26 showing the operational states of the pixel.
Figure 27B:
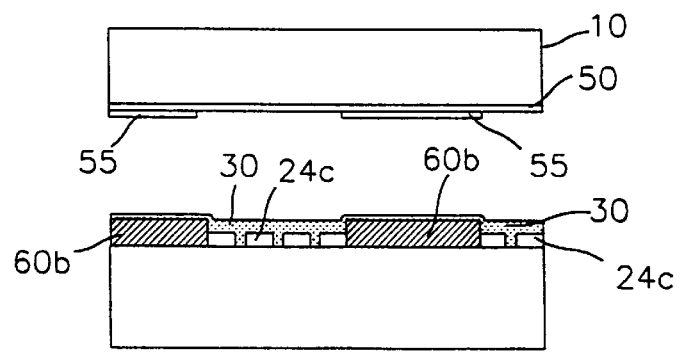

As shown in FIGS. 27A and 27B, the walls 60b having predetermined width and height are located in the areas corresponding to the light blocking layer 55 on the front surface of the front plate 10. FIG. 27A shows a state in which current is applied to the pixel electrodes 24c, and the magnetic fluid 30, which is initially on the surface of the pixel electrodes, is pushed up onto the walls 60b by the force generated by the magnetic field. FIG. 27B shows a state in which the current supply to the pixel electrodes 24c is terminated and the magnetic fluid is restored to the pixel electrode 24c by surface tension.

Embodiment 10

In the present embodiment in which the structure of the embodiment 5 is improved, the spacer layer 11a on the front plate 10 and, particularly, the light blocking layer 55a are produced during the processes for forming the red color filter 50R, the green color filter 50G, and the blue color filter 50B. The light blocking layer 55A, which is particularly applied to the reflective type, can be formed during the processes over the areas corresponding to the body of the pixel electrode, that is, in the portion of area excluding the light transmission area over the pixel electrode.

Figure 28:
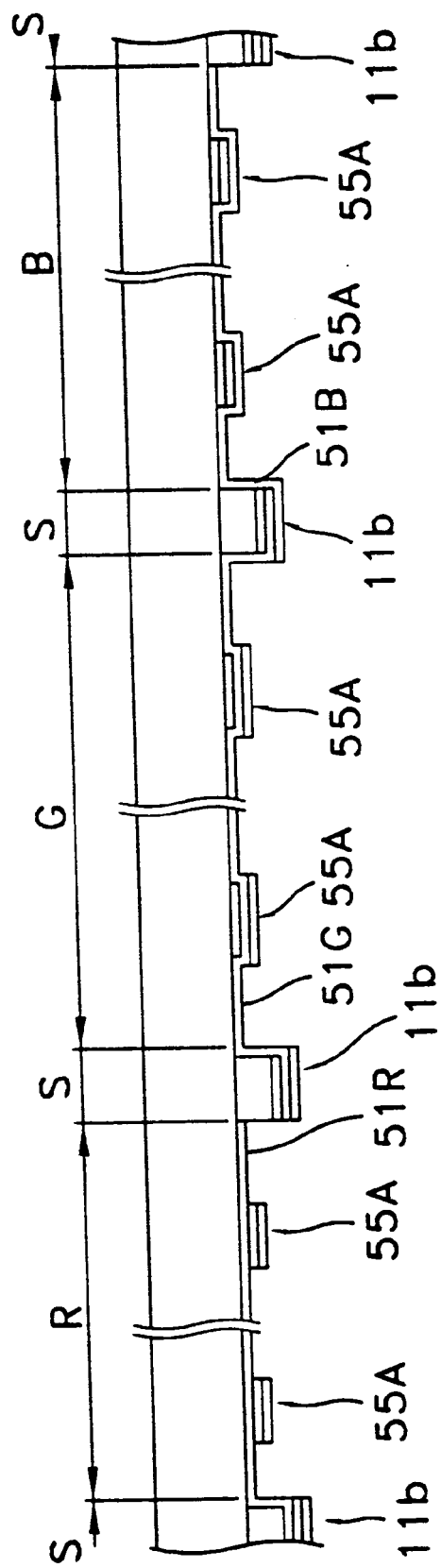
FIG. 28 is a partial sectional view of a front plate in tenth embodiment of the present invention in which spacers and light blocking layers are formed by the color filters.

Referring to FIG. 28, a spacer 11b between pixels and the light blocking layer 55A in the middle of the pixels are located where light transmission is to be blocked by overlapping the color filters 51R, 51G, and 51B.

FIGS. 29A through 29D show process steps for forming the color filter layers, the spacer, and the light blocking layer.

Figure 29A:
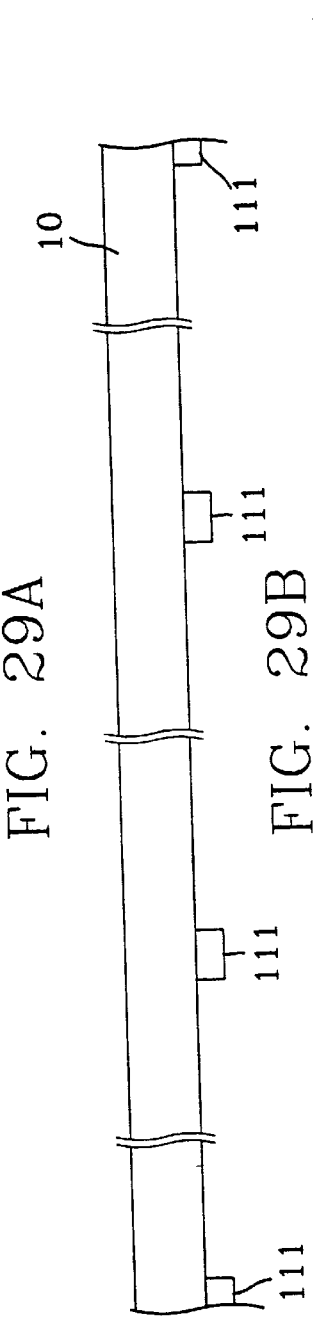
FIGS. 29A through 29D show the processes for forming the color filter layer, the spacer, and the light blocking layer of FIG. 28.

As shown in FIG. 29A, a base layer 111 for the spacer 11b is formed at regions on the inner surface of a substrate 10. The base layer 111 is located in regions at the boundaries between adjacent pixels.

Figure 29B:
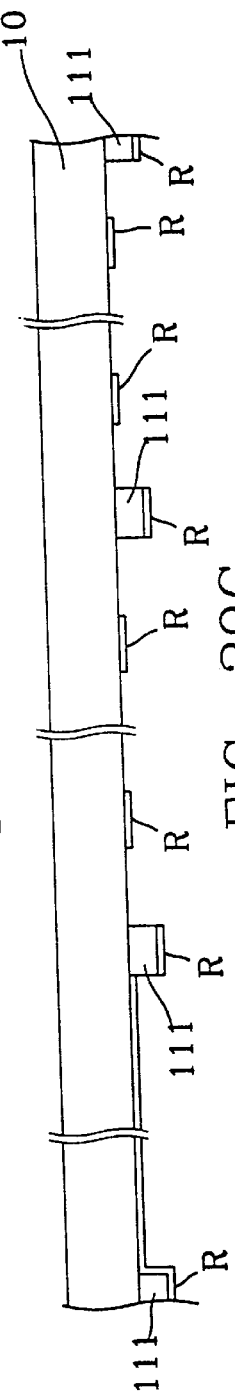

As shown in FIG. 29B, the red filter layer 50R is formed on the area R and areas in which a light blocking layer is required in the areas S, G, and B and on the spacer.

Figure 29C:
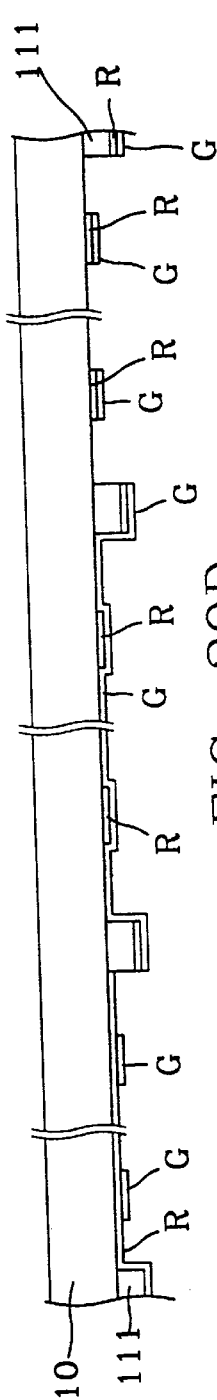

As shown in FIG. 29C, the green filter layer 50G is formed on the area G and areas in which a light blocking layer is required in the areas S, R, and G and on the spacer.

Figure 29D:
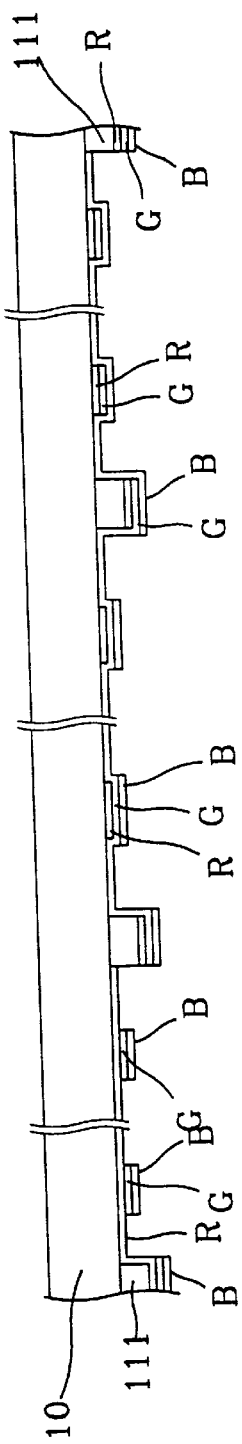

Finally, the color filter layers, the spacer, and the light blocking layers are completed as shown in FIG. 28 by forming the blue filter layer 50B on the area B and areas in which a light blocking layer is required in the areas S, R, and G and on the spacer as shown in FIG. 29D.

The present embodiment can be applied to any embodiment in which the light blocking layer is required in the pixel area and/or spacer.

The color filters can be formed by generally used processes for forming a patterned thin films using, for instance, photolithography. A spacer layer and a light blocking layer can be formed without any additional patterned thin film forming processes.

Hereinafter, the typical processes for fabricating the reflective type display panel according to the present invention are described with reference to FIGS. 31 through 42.

FIG. 31 shows a state in which base layers are formed on front and rear surfaces by general processes including photolithography. Namely, the first electrode 21, the insulating layer 23a, and the second electrode 22 are formed sequentially to have the predetermined patterns on the front surface. The first signal line 71 and the second signal line 61 are formed, with an insulating layer 80 incorporated therebetween, corresponding to the first and second electrodes 21 and 22.

A through hole 72 is formed in the first signal line 71 and a through hole 62, maintaining a predetermined gap from the through hole 72, is formed in the second signal line 61 and the insulating layer 80. A through hole 21a corresponding to the through hole 72 of the first signal line 71 is formed in the first electrode 21. A through hole 21a corresponding to the through hole 62 of the second signal line 61 and a through hole 21c for an electrical contact of the pixel electrode, maintaining a predetermined distance from the through holes 62 and 21a, are formed in the second electrode 22 and the insulating layer 23a.

Referring to FIG. 32, an insulating ferromagnetic shield layer 25 is formed on the second electrode 22 on the resultant structure shown in FIG. 31. A through hole 25a, concentric with the through hole 21a of the second electrode 22 and having a smaller diameter than that of the through hole 21a, and a through hole 25b, concentric with the through hole 21a of the first electrode and having a smaller diameter than that of the through hole 21a, are formed in the ferromagnetic shield layer 25.

Figure 33:
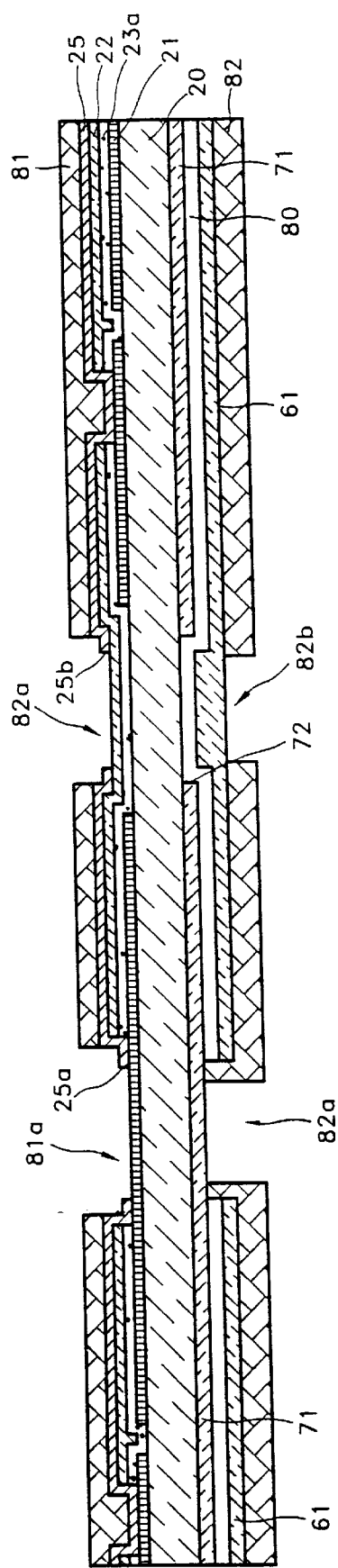

Referring to FIG. 33, masking layers 81 and 82 for plating are formed on both surfaces of the above structure. At this time, through holes 81a and 81b, concentric with the through holes 25a and 25b of the ferromagnetic shield layer 25 and having smaller diameters than those of the through holes 25a and 25b, are formed in the first masking layer 81 of the upper portion. Also, through holes 82a and 82b, corresponding to the through holes 23a and 21b of the first electrode 21 and the second electrode 22, are formed in the second masking layer 82 of the lower portion. At this time, the through hole 82a has a smaller diameter than that of the through hole 62 of the second signal line 61 and the through hole 82b has a smaller diameter than that of the through hole 72 of the first signal line 71.

Figure 34:
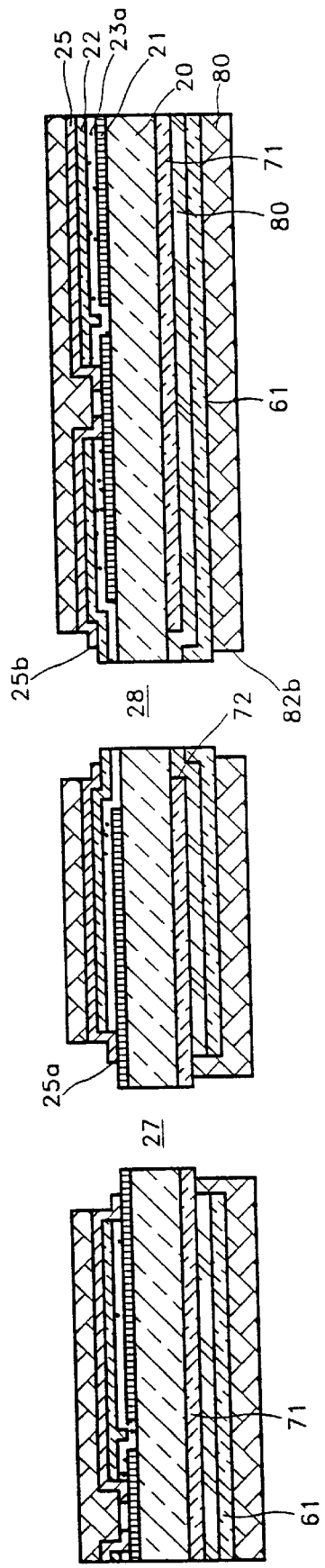

Referring to FIG. 34, through holes 27 and 28 are formed in the substrate. At this time, the through holes 27 and 28 are respectively positioned in the center of the through holes corresponding to the first and second masking layers 81 and 82.

Figure 35:
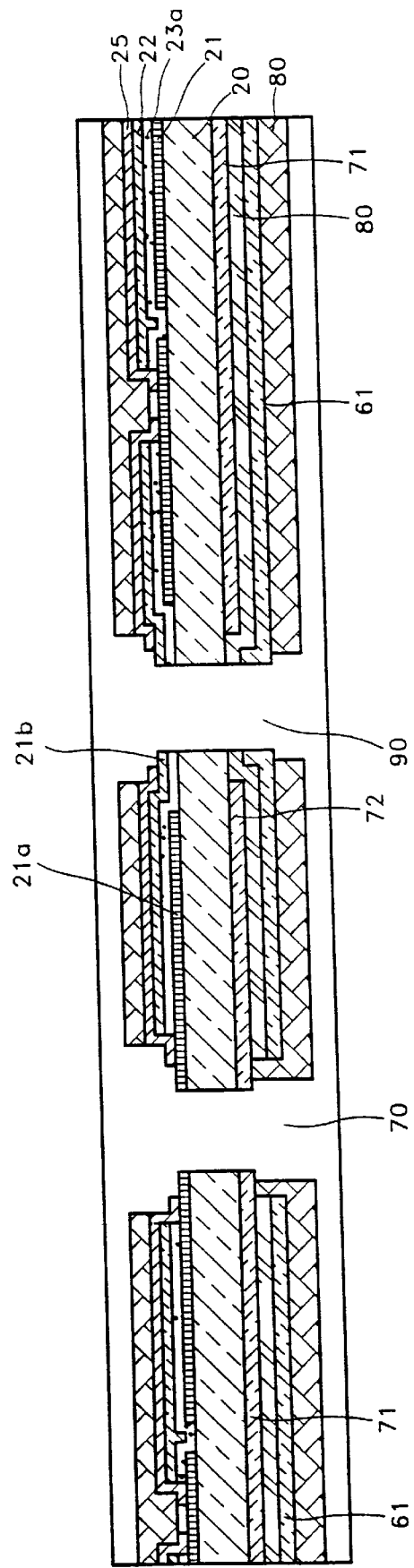

As shown in FIG. 35, contact layers 70 and 90 are formed filling the through holes 27 and 28 and the first electrode 21 and the second electrode 22 are electrically connected to the first signal line 71 and the second signal line 61, respectively.

Figure 36:
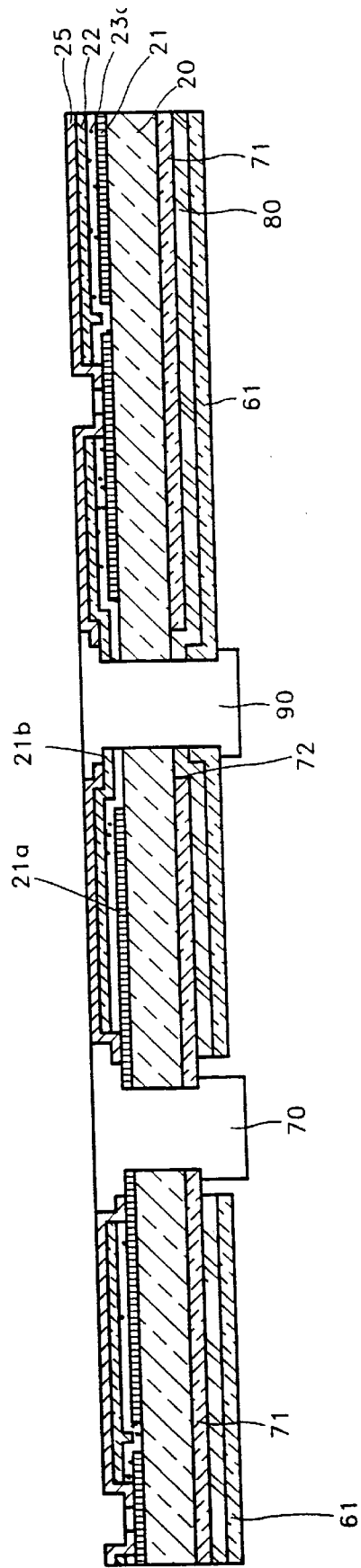

As shown in FIG. 36, the contact layers 70 and 90 formed by plating are electrically separated by removing the first and second masking layers by a lift-off method and the degree of smoothness of the surface is heightened by polishing the entire exposed surface by a polishing method, if necessary.

Figure 37:
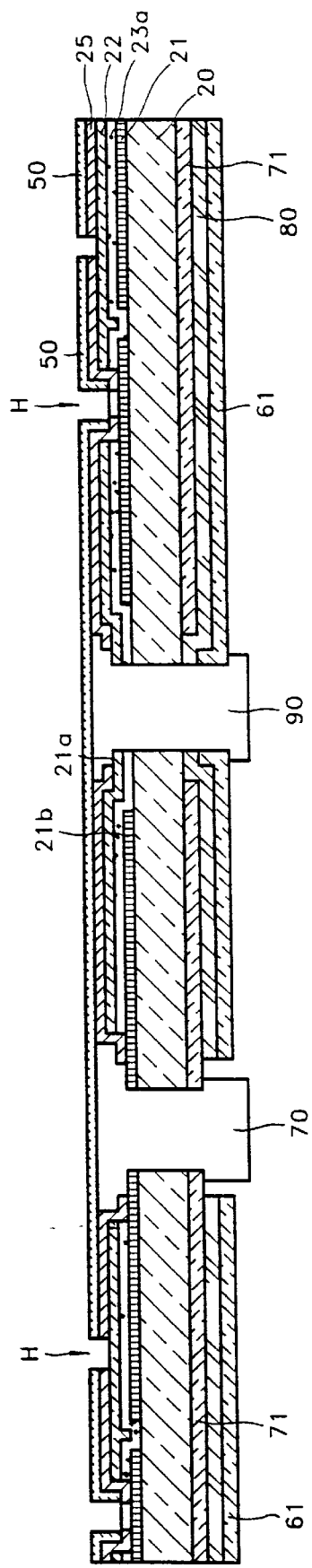

As shown in FIG. 37, a color reflective film 50 is formed on the ferromagnetic shield layer 25. At this time, through holes for electrical contacts between the following pixel electrode 24, the first electrode 21, and the second electrode 22 are formed in the color reflective film 50 and the ferromagnetic layer 25.

Figure 38:
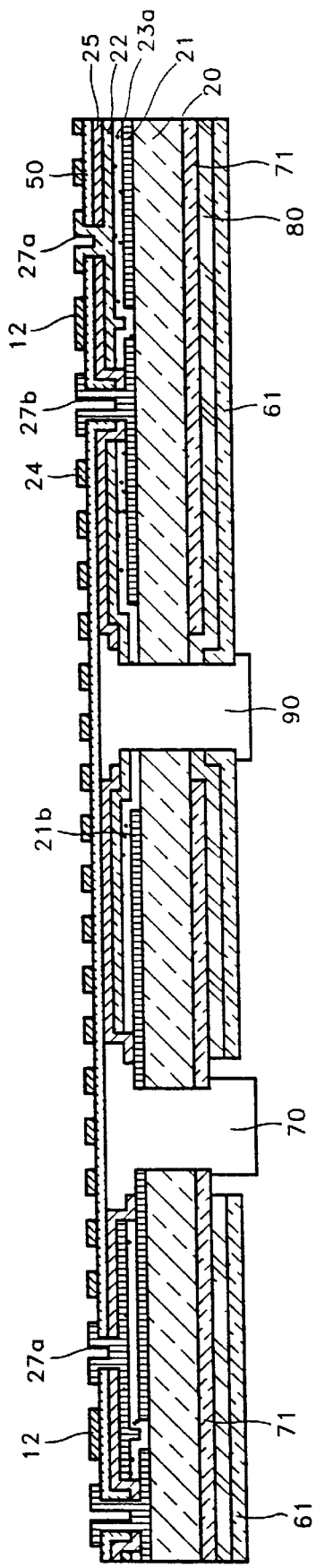

As shown in FIG. 38, the pixel electrode 24 and a first spacer 12 between the pixel electrodes are formed on the color reflective film 50. At this time, the pixel electrode 24 is electrically connected to the first and second electrodes in the lower portion thereof by the contact layers 27a and 27b.

As shown in FIG. 39, the magnetic fluid 30 is formed to have a predetermined thickness on the pixel electrode 24 by, for instance, a spin coating method and the magnetic fluid 30 is frozen.

As shown in FIG. 40, the pixel electrode 24 is exposed by polishing the surface of the frozen magnetic fluid 30 to a predetermined depth.

As shown in FIG. 41, a completed display panel shown in FIG. 42 is obtained by attaching the front plate 10 on which a second spacer 11, corresponding to the first spacer 12 formed to a predetermined height on the rear plate 20, is formed. At this time, the adhesion between the first spacer and the second spacer is provided by compression or adhesives.

In the display panel according to the present invention, the manufacturing process can be significantly simplified because the making of the panel is basically fixing the front plate to the rear plate while maintaining a distance so that the magnetic fluid does not touch the front plate after coating the inner surface of the rear plate. No complex processes, such as the one for injecting liquid crystal as required in the liquid crystal display device, is required. Air can exist in the space in which the magnetic fluid exists and thus a simple seal with narrow width is required to prevent leakage or evaporation of magnetic fluid while an extremely complicated sealing process is required in the case of the liquid crystal display at the edge of the display panel.

Figure 30:
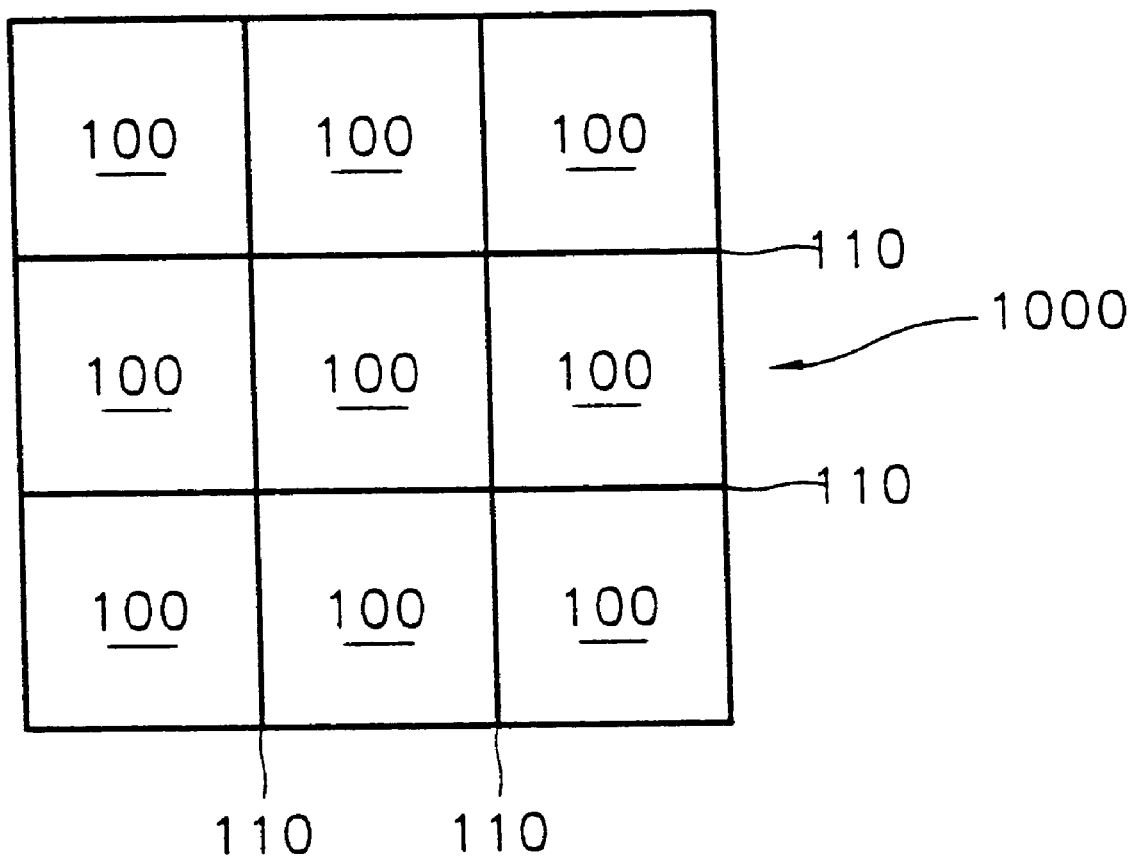
FIG. 30 is the front view of a large display device in which a plurality of display panels according to the present invention are integrated.

Additionally, in the reflective type display panel, since electrical signals to the first electrode 21 and the second electrode 22 can be applied from the backside of the rear plate through the through holes 70 and 60, the edge terminals required for the application of signals to the pixel electrodes can be removed. Thus, it is possible to use the entire panel area as an active screen and to minimize the margin at the edge. Therefore, as shown in FIG. 30, when a large display device 1000 is constructed by integrating a plurality of display panels 100 of the present invention, the display panels can be integrated to a degree in which the width of the boundary 110 between the unit display panels 100 is minimized due to the minimized margin and is not recognizable, namely, to a degree in which a distance between adjacent pixels between the unit display panels is comparable with that between pixels in the same panel.

Also, a plurality of through holes for connecting the signal lines to the first and second electrodes can be prepared such that the voltage drop in each electrode can be minimized. Namely, a signal is applied to one end or both ends of each electrode in a conventional technology, but a signal is applied to a plurality of middle portions of each electrode in the case of the present invention. Therefore, it is possible to remarkably reduce the voltage drop in an electrode having a high resistance.

The present invention is not restricted to the above embodiments, and many variations are possible within the scope and spirit of the present invention by anyone skilled in the art.

What is claimed is:

1. A magnetic fluid display panel comprising:
   a front plate and a rear plate, separated from each other;
   a plurality of first electrodes arranged in linear strips on an inner surface of said rear plate and aligned along a first direction;
   a plurality of second electrodes arranged in strips and aligned along a direction perpendicular to said first electrodes, and supported by and electrically insulated from said first electrodes;
   a plurality of pixels arranged in a pattern, each pixel being located at an intersecting point of one of said first electrodes and one of said second electrodes, having a light transmission area through which light can pass, and having a pixel electrode electrically connected to adjacent first and second electrodes, a magnetic field being formed around a pixel electrode in response to a current flowing through the pixel electrode; and
   a magnetic fluid on said pixels proximate said rear plate, between said front plate and said rear plate, not contacting said front plate, and adjacent said pixel electrodes, said magnetic fluid preventing light from passing through a light transmission area of a pixel when no current is flowing through the respective pixel electrode and permitting passage of light through said light transmission area in response to current flowing through said respective pixel electrode, the current generating a magnetic field urging said magnetic fluid away from said light transmission area and toward said respective pixel electrode.

2. The magnetic fluid display panel as claimed in claim 1, including color filters opposite said pixel electrodes.

3. The magnetic fluid display panel as claimed in claim 2, including a spacer layer interposed between said front plate and said rear plate for maintaining a separation between said front plate and said rear plate.

4. The magnetic fluid display panel as claimed in claim 1, including ferromagnetic shield layers between said pixel electrodes and said second electrodes.

5. The magnetic fluid display panel as claimed in claim 4, including a spacer layer interposed between said front plate and said rear plate for maintaining a separation between said front plate and said rear plate.

6. The magnetic fluid display panel as claimed in claim 1, wherein said pixel electrodes zigzag.

7. The magnetic fluid display panel as claimed in claim 6, including a plurality of signal lines for transmitting signals to said first and second electrodes, located on a rear surface of said rear plate and in through holes in which contact layers electrically connecting said first and second electrodes to said signal lines are located.

8. The magnetic fluid display panel as claimed in claim 7, wherein said spacer layer comprises a first spacer on the inner surface of said rear plate and a second spacer on an inner surface of said front plate.

9. The magnetic fluid display panel as claimed in claim 6, including a spacer layer interposed between said front plate and said rear plate for maintaining a separation between said front plate and said rear plate.

10. The magnetic fluid display panel as claimed in claim 1, including color reflective films opposite said pixel electrodes.

11. The magnetic fluid display panel as claimed in claim 10, including a spacer layer interposed between said front plate and said rear plate for maintaining a separation between said front plate and said rear plate.

12. The magnetic fluid display panel as claimed in claim 1, including color filters corresponding to said pixel electrodes and located on said front plate.

13. The magnetic fluid display panel as claimed in claim 12, wherein said color filters comprise unit color filters and a spacer comprising overlapping parts of said unit color filters at a boundaries between adjacent unit color filters.

14. The magnetic fluid display panel as claimed in claim 13, wherein said pixel electrodes have zigzag shapes.

15. The magnetic fluid display panel as claimed in claim 13, including a plurality of signal lines for transmitting signals to said first and second electrodes, located on a rear surface of said rear plate and in through holes in which contact layers electrically connecting said first and second electrodes to said signal lines are located.

16. The magnetic fluid display panel as claimed in claim 15, wherein said first spacer is manufacture when said pixel electrode is manufactured.

17. The magnetic fluid display panel as claimed in claim 12, wherein said pixel electrodes have a zigzag shapes.

18. The magnetic fluid display panel as claimed in claim 12, including a spacer layer interposed between said front plate and said rear plate for maintaining a separation between said front plate and said rear plate.

19. The magnetic fluid display panel as claimed in claim 12, wherein said color filters comprise unit color filters, a spacer comprising overlapping parts of said unit color filters and located at boundaries between adjacent unit color filters, and a light blocking layer located outside said light transmission areas of said pixels.

20. The magnetic fluid display panel as claimed in claim 19, wherein said light blocking layer includes overlapping parts of said unit color filters.

21. The display panel as claimed in claim 19, including walls projecting outwardly relative to said rear plate, toward said front plate, having a width and a height, and centrally located in said first sub-pixel and said second sub-pixel.

22. The display panel as claimed in claim 21, wherein said walls comprise a group of dielectric columns.

23. The magnetic fluid display panel as claimed in claim 1, including a spacer layer interposed between said front plate and said rear plate for maintaining a separation between said front plate and said rear plate.

24. The magnetic fluid display panel as claimed in claim 1, wherein said pixel electrodes have zigzag shapes and including walls projecting outwardly relative to said rear plate, toward said front plate, having a width and a height, and located between adjacent pixels.

25. The magnetic fluid display panel as claimed in claim 24, including light blocking layers corresponding to said walls and located on an inner surface of said front plate.

26. A magnetic fluid display panel comprising:
   a front plate and a rear plate, separated from each other;
   a plurality of first electrodes arranged in linear strips on an inner surface of said rear plate and aligned along a first direction;
   a plurality of second electrodes arranged in strips, aligned along a direction perpendicular to said first electrodes and, supported by and electrically insulated from said first electrodes;
   a plurality of third electrodes supported by said rear plate and parallel to one of said first and second electrodes;
   a plurality of pixels arranged in a pattern and comprising a first sub-pixel and a second sub-pixel, said first sub-pixel being separated from said second sub-pixel by a distance, wherein said first sub-pixel includes a first pixel electrode electrically connected to said first and second electrodes and said second sub-pixel includes a second pixel electrode electrically connected to said second and third electrodes, each of said first and second sub-pixels including a respective light transmission area through which light can pass, a magnetic field being formed around each pixel electrode in response to a current flowing through the pixel electrode; and
   a magnetic fluid on said first and second sub-pixels proximate said rear plate, between said front plate and said rear plate, not contacting said front plate, and adjacent said pixel electrodes, said magnetic fluid preventing light from passing through the light transmission area of a pixel when no current is flowing through the respective pixel electrode and for permitting passage of light through said light transmission area in response to a current flowing through said respective pixel electrode, the current generating a magnetic field urging said magnetic fluid away from one of said first and second sub-pixels and toward said light transmission area of the other of said first and second sub-pixels.

27. The display panel as claimed in claim 26, including ferromagnetic shield layers opposite said pixel electrodes.

28. The display panel as claimed in claim 27, including a spacer layer interposed between said front plate and said rear plate for maintaining a separation between said front plate and said rear plate.

29. The display panel as claimed in claim 26, wherein said pixel electrodes have zigzag shapes.

30. The display panel as claimed in claim 29, including a spacer layer interposed between said front plate and said rear plate for maintaining a separation between said front plate and said rear plate.

31. The display panel as claimed in claim 26, including color filters corresponding to said pixel electrodes and located on said front plate.

32. The display panel as claimed in claim 31, including a spacer layer interposed between said front plate and said rear plate for maintaining a separation between said front plate and said rear plate.

33. The display panel as claimed in claim 31, wherein said color filters comprise unit color filters and said spacer comprises overlapping parts of said unit color filters at boundaries between adjacent unit color filters.

34. The display panel as claimed in claim 31, wherein said color filters comprise a plurality of unit color filters, a spacer located at boundaries between adjacent unit color filters and comprising overlapping parts of said unit color filters, and light blocking layers located in areas outside said light transmission areas of said pixels.

35. The display panel as claimed in claim 26, including a spacer layer interposed between said front plate and said rear plate for maintaining a separation between said front plate and said rear plate.

36. The display panel as claimed in claim 35, including said spacer layer comprises a first spacer on the inner surface of said rear plate and a second on an inner surface of said front plate.

37. The display panel as claimed in claim 36, wherein said first spacer is formed when said pixel electrode is formed.

38. The display panel as claimed in claim 26, including walls projecting outwardly relative to said rear plate, toward said front plate, having a width and a height, and located along boundaries between said first sub-pixel and said second sub-pixel.

39. The display panel as claimed in claim 38, including light blocking layers corresponding to said walls and located on an inner surface of said front plate.

40. The display panel as claimed in claim 39, wherein said light blocking layers comprise overlapping parts of said unit color filters.

41. The display panel as claimed in claim 26, including walls projecting outwardly relative to said rear plate, toward said front plate, having a width and a height, and located between said first sub-pixel and said second sub-pixel.

42. The display panel as claimed in claim 41, wherein said walls comprise a group of dielectric columns.

43. A method for manufacturing a magnetic fluid display panel comprising:
   forming a plurality of first electrodes in linear strips on an inner surface of a rear plate and aligned along a first direction;
   forming a first insulating film on said first electrodes;
   forming a plurality of second electrodes in linear strips on said first insulating film and aligned along a direction perpendicular to the first direction;
   forming a second insulating film on said second electrode;
   forming, on said second insulating film, a pattern of pixels, each pixel lying at an intersection of one of said first electrodes and one of said second electrodes, each pixel including a pixel electrode electrically connected to the first and second electrodes, generating a magnetic field in response to a current flowing through said pixel electrode, and a light transmission area for transmitting light;
   applying a magnetic fluid on said pixel electrodes and said second insulating layer in said light transmission areas;
   freezing said magnetic fluid;
   exposing said pixel electrodes by polishing said frozen magnetic fluid; and
   fixing a front plate to said rear plate, while maintaining a distance between said front and rear plates and between said front plate and said magnetic fluid.

44. A method for manufacturing a display panel comprising:
   forming on an outer surface of a rear plate a plurality of signal lines for transmitting a display signal;

forming a plurality of first electrodes in linear strips on an inner surface of a rear plate and aligned along a first direction;

forming a first insulating film on said first electrodes;

forming a plurality of second electrodes in linear strips on said first insulating film and aligned along a direction perpendicular to the first direction;

forming a second insulating film on said second electrode;

forming through holes and contact layers in the through holes electrically connecting said first and second electrodes to said signal lines;

forming, on said second insulating film, a pattern of pixels, each pixel lying at an intersection of one of said first electrodes and one of said second electrodes, each pixel including a pixel electrode electrically connected to the first and second electrodes, generating a magnetic field in response to a current flowing through said pixel electrode, and a light transmission area for transmitting light;

applying a magnetic fluid on said pixel electrodes and said second insulating layer in said light transmission areas;

freezing said magnetic fluid;

exposing said pixel electrodes by polishing said frozen magnetic fluid; and fixing a front plate to said rear plate, while maintaining a distance between said front and rear plates and between said front plate and said magnetic fluid.

* * * * *